United States Patent
Brin et al.

(10) Patent No.: US 8,893,010 B1
(45) Date of Patent: Nov. 18, 2014

(54) EXPERIENCE SHARING IN LOCATION-BASED SOCIAL NETWORKING

(75) Inventors: Sergey Brin, Palo Alto, CA (US); Steven John Lee, San Francisco, CA (US); Indika Charles Mendis, Mountain View, CA (US); Max Benjamin Braun, San Francisco, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/314,177

(22) Filed: Dec. 8, 2011

Related U.S. Application Data

(60) Provisional application No. 61/510,020, filed on Jul. 20, 2011.

(51) Int. Cl.
G06F 3/00 (2006.01)

(52) U.S. Cl.
USPC .......................................... 715/738

(58) Field of Classification Search
USPC ................................ 715/738, 722
See application file for complete search history.

(56) References Cited

U.S. PATENT DOCUMENTS

| | | | |
|---|---|---|---|
| 7,546,352 B1 | 6/2009 | Bhattiprolu et al. | |
| 7,683,937 B1 | 3/2010 | Blumenfeld | |
| 7,711,961 B2 | 5/2010 | Fujinuma et al. | |
| 7,742,184 B2 | 6/2010 | Seki et al. | |
| 2005/0138560 A1 | 6/2005 | Lee et al. | |
| 2005/0266884 A1 | 12/2005 | Marriott et al. | |
| 2006/0132382 A1 | 6/2006 | Jannard | |
| 2007/0021058 A1* | 1/2007 | Arseneau et al. | 455/3.06 |
| 2007/0281690 A1* | 12/2007 | Altman et al. | 455/435.1 |
| 2008/0023002 A1 | 1/2008 | Guelzow et al. | |
| 2008/0103877 A1 | 5/2008 | Gerken | |
| 2008/0134235 A1 | 6/2008 | Kalaboukis | |
| 2008/0250332 A1* | 10/2008 | Farrell et al. | 715/753 |
| 2008/0270541 A1 | 10/2008 | Keener et al. | |
| 2009/0013263 A1 | 1/2009 | Fortnow et al. | |
| 2009/0144392 A1* | 6/2009 | Wang et al. | 709/217 |

(Continued)

FOREIGN PATENT DOCUMENTS

| | | |
|---|---|---|
| WO | 2009052618 | 4/2009 |
| WO | 2010007612 | 1/2010 |

OTHER PUBLICATIONS

Martin, Reed, et al., neXtream: A Multi-Device, Social Approach to Video Content Consumption, MIT Media Lab, IEEE, 2010.

(Continued)

*Primary Examiner* — William Bashore
*Assistant Examiner* — Rayeez Chowdhury
(74) *Attorney, Agent, or Firm* — McDonnell Boehnen Hulbert & Berghoff LLP

(57) ABSTRACT

An exemplary computer-implemented method involves a computing device: (a) causing a graphic display to display a user-interface for accessing one or more experience-sharing sessions, wherein the user-interface is associated with a first user-account; (b) determining a location; (c) initiating a location-based search for one or more associated experience-sharing sessions, wherein each associated experience sharing session involves at least one second user-account that has a confirmed association with the first user-account, and wherein the location-based search is based on the determined location; and (d) causing the graphic display to display at least a portion of each of one or more associated experience-sharing sessions that result from the location-based search.

15 Claims, 12 Drawing Sheets

(56) References Cited

U.S. PATENT DOCUMENTS

| | | |
|---|---|---|
| 2009/0157816 A1 | 6/2009 | Pattan |
| 2009/0215477 A1 | 8/2009 | Lee et al. |
| 2009/0219166 A1 | 9/2009 | MacFarlane et al. |
| 2010/0020229 A1 | 1/2010 | Hershey et al. |
| 2010/0082759 A1 | 4/2010 | Nalliah et al. |
| 2010/0125531 A1 | 5/2010 | Wong |
| 2010/0145947 A1* | 6/2010 | Kolman et al. ............... 707/736 |
| 2010/0161635 A1 | 6/2010 | Dey |
| 2010/0199340 A1 | 8/2010 | Jonas et al. |
| 2011/0035453 A1 | 2/2011 | Koul et al. |
| 2011/0055046 A1 | 3/2011 | Bowen et al. |
| 2011/0096168 A1 | 4/2011 | Siann et al. |
| 2011/0107220 A1 | 5/2011 | Perlman |
| 2011/0140913 A1 | 6/2011 | Montenero |
| 2011/0221657 A1 | 9/2011 | Haddick et al. |
| 2011/0246421 A1 | 10/2011 | Takahashi |
| 2012/0056972 A1 | 3/2012 | Benedeki et al. |
| 2012/0060101 A1* | 3/2012 | Vonog et al. ............... 715/751 |
| 2012/0166453 A1 | 6/2012 | Broder |
| 2012/0182384 A1 | 7/2012 | Anderson et al. |
| 2012/0320013 A1 | 12/2012 | Perez et al. |

OTHER PUBLICATIONS

Cesar, Pablo, Enhancing Social Sharing of Videos: Fragment, Annotate, Enrich, and Share, ACM, Oct. 2008.

Wikimedia Foundation Inc., Ustream, Nov. 17, 2011 available online at http://en.wikipedia.org/wiki/Ustream (last visited Dec. 6, 2011).

Heater, Brian, Color for Facebook iPhone App Hands-On, available online at http://www.engadget.com/2011/12/01/color-for-facebook-iphone-app-hands-on/ (last visited Dec. 6, 2011).

* cited by examiner

EXPERIENCE SHARING IN LOCATION-BASED SOCIAL NETWORKING

CROSS REFERENCE TO RELATED APPLICATIONS

This application claims priority to U.S. Patent App. No. 61/510,020, filed Jul. 20, 2011, entitled "Experience Sharing", the contents of which are incorporated by reference herein for all purposes.

BACKGROUND

Unless otherwise indicated herein, the materials described in this section are not prior art to the claims in this application and are not admitted to be prior art by inclusion in this section.

Computing devices such as personal computers, laptop computers, tablet computers, cellular phones, and countless types of Internet-capable devices are increasingly prevalent in numerous aspects of modern life. Over time, the manner in which these devices are providing information to users is becoming more intelligent, more efficient, more intuitive, and/or less obtrusive.

The trend toward miniaturization of computing hardware, peripherals, as well as of sensors, detectors, and image and audio processors, among other technologies, has helped open up a field sometimes referred to as "wearable computing." In the area of image and visual processing and production, in particular, it has become possible to consider wearable displays that place a very small image display element close enough to a wearer's (or user's) eye(s) such that the displayed image fills or nearly fills the field of view, and appears as a normal sized image, such as might be displayed on a traditional image display device. The relevant technology may be referred to as "near-eye displays."

Near-eye displays are fundamental components of wearable displays, also sometimes called "head-mounted displays" (HMDs). A head-mounted display places a graphic display or displays close to one or both eyes of a wearer. To generate the images on a display, a computer processing system may be used. Such displays may occupy a wearer's entire field of view, or only occupy part of wearer's field of view. Further, head-mounted displays may be as small as a pair of glasses or as large as a helmet.

Emerging and anticipated uses of wearable displays include applications in which users interact in real time with an augmented or virtual reality. Such applications can be mission-critical or safety-critical, such as in a public safety or aviation setting. The applications can also be recreational, such as interactive gaming.

SUMMARY

In one aspect, an exemplary computer-implemented method may involve a computing device: (a) causing a graphic display to display a user-interface for accessing one or more experience-sharing sessions, wherein the user-interface is associated with a first user-account; (b) determining a location; (c) initiating a location-based search for one or more associated experience-sharing sessions, wherein each associated experience sharing session involves at least one second user-account that has a confirmed association with the first user-account, and wherein the location-based search is based on the determined location; and (d) causing the graphic display to display at least a portion of each of one or more associated experience-sharing sessions that result from the location-based search.

In another aspect, an exemplary system may include a non-transitory computer readable medium and program instructions stored on the non-transitory computer readable medium. The program instructions may be executable by at least one processor to: (a) display a user-interface for accessing one or more experience-sharing sessions on a graphic display, wherein the user-interface is associated with a first user-account; (b) determine a location; (c) initiate a location-based search for one or more associated experience-sharing sessions, wherein each associated experience sharing session involves at least one second user-account that has a confirmed association with the first user-account, and wherein the location-based search is based on the determined location; and (d) display at least a portion of each of one or more associated experience-sharing sessions that result from the location-based search.

In yet another aspect, an exemplary system may include: (a) means for causing a graphic display to display a user-interface for accessing one or more experience-sharing sessions, wherein the user-interface is associated with a first user-account; (b) means for determining a location; (c) means for initiating a location-based search for one or more associated experience-sharing sessions, wherein each associated experience sharing session involves at least one second user-account that has a confirmed association with the first user-account, and wherein the location-based search is based on the determined location; and (d) means for causing the graphic display to the graphic display to display at least a portion of each of one or more associated experience-sharing sessions that result from the location-based search.

In an additional aspect, an exemplary computer-implemented method may involve: (i) a server system receiving a request to initiate a location-based search of experience-sharing sessions, wherein the request indicates (a) a first user-account and (b) a location upon which to base the location-based search; (ii) the server system initiating the location-based search, wherein the location-based search comprises: (a) using the indicated location as a basis for determining search criteria; and (b) determining search results comprising one or more associated experience-sharing sessions that meet the search criteria, wherein each associated experience sharing session involves at least one second user-account that has a confirmed association with the first user-account; and (iv) the server system sending the search results to the computing device.

In a further aspect, an exemplary system may include: (a) means for causing a graphic display to display a user-interface for accessing one or more experience-sharing sessions, wherein the user-interface is associated with a first user-account; (b) means for determining a location; (c) means for initiating a location-based search for one or more associated experience-sharing sessions, wherein each associated experience sharing session involves at least one second user-account that has a confirmed association with the first user-account, and wherein the location-based search is based on the determined location; and (d) means for causing the graphic display to display at least a portion of each of one or more associated experience-sharing sessions that result from the location-based search.

These as well as other aspects, advantages, and alternatives, will become apparent to those of ordinary skill in the art by reading the following detailed description, with reference where appropriate to the accompanying drawings.

DETAILED DESCRIPTION

Figure 1:
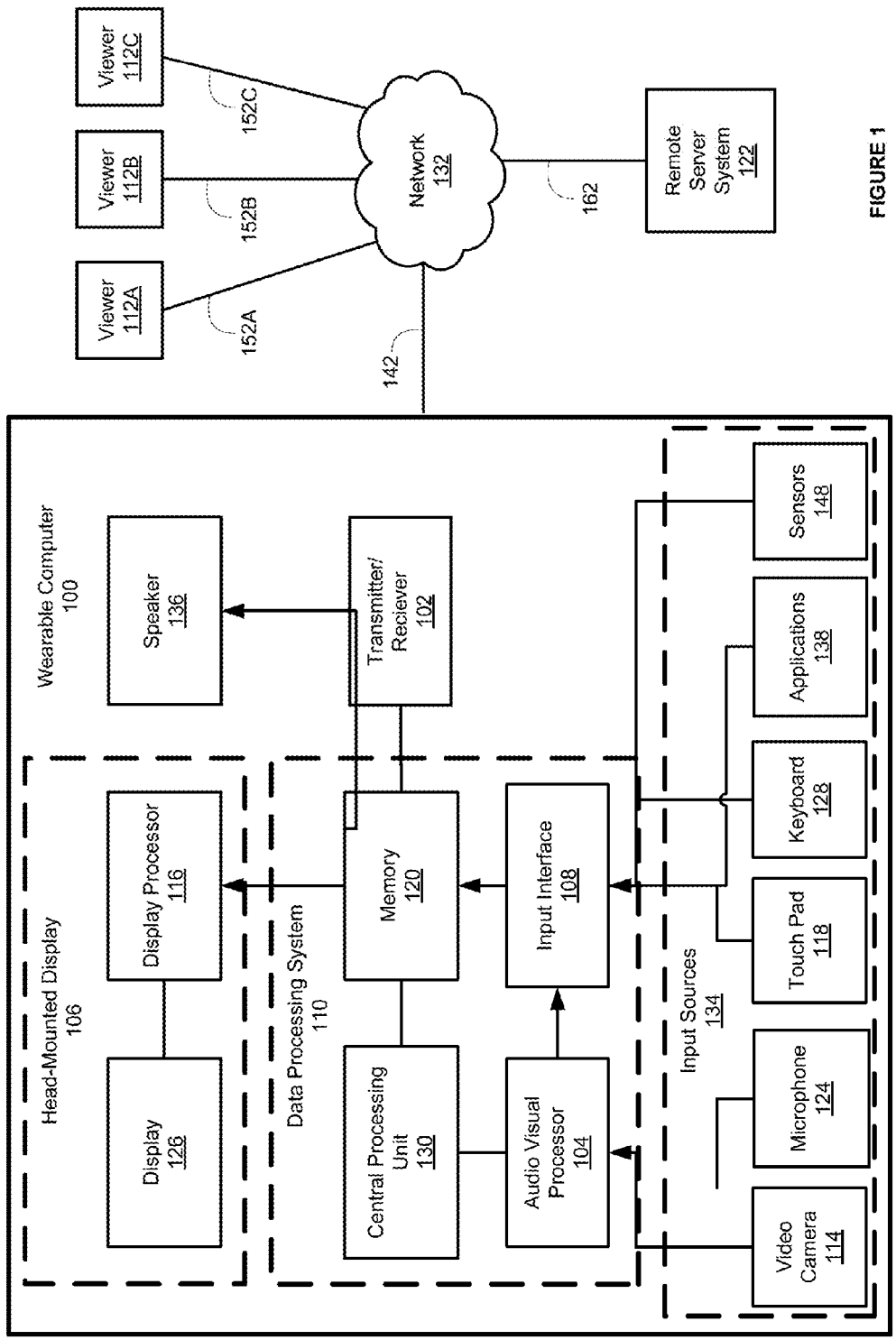
FIG. 1 is a simplified diagram of a sharing device, according to an exemplary embodiment.

Exemplary methods and systems are described herein. It should be understood that the word "exemplary" is used herein to mean "serving as an example, instance, or illustration." Any embodiment or feature described herein as "exemplary" is not necessarily to be construed as preferred or advantageous over other embodiments or features. The exemplary embodiments described herein are not meant to be limiting. It will be readily understood that certain aspects of the disclosed systems and methods can be arranged and combined in a wide variety of different configurations, all of which are contemplated herein.

In the following detailed description, reference is made to the accompanying figures, which form a part thereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are contemplated herein.

Overview of Experience Sharing

Experience sharing generally involves a user sharing media that captures their experience with one or more other users. In an exemplary embodiment, a user may use a wearable computing device or another computing device to capture media that conveys the world as they are experiencing it, and then transmit this media to others in order to share their experience. For example, in an experience-sharing session (ESS), a user may share a point-of-view video feed captured by a video camera on a head-mounted display of their wearable computer, along with a real-time audio feed from a microphone of their wearable computer. Many other examples are possible as well.

In an experience-sharing session, the computing device that is sharing a user's experience may be referred to as a "sharing device" or a "sharer," while the computing device or devices that are receiving real-time media from the sharer may each be referred to as a "viewing device" or a "viewer." Additionally, the content that is shared by the sharing device during an experience-sharing session may be referred to as a "share." Further, a computing system that supports an experience-sharing session between a sharer and one or more viewers may be referred to as a "server", an "ES server," "server system," or "supporting server system."

In some exemplary methods, the sharer may transmit a share in real time to the viewer, allowing the experience to be portrayed as it occurs. In this case, the sharer may also receive and present comments from the viewers. For example, a sharer may share the experience of navigating a hedge maze while receiving help or criticism from viewers. In another embodiment, the server may store a share so that new or original viewers may access the share outside of real time.

A share may include a single type of media content (i.e., a single modality of media), or may include multiple types of media content (i.e., multiple modalities of media). In either case, a share may include a video feed, a three-dimensional (3D) video feed (e.g., video created by two cameras that is combined to create 3D video), an audio feed, a text-based feed, an application-generated feed, and/or other types of media content.

Further, in some embodiments a share may include multiple instances of the same type of media content. For example, in some embodiments, a share may include two or more video feeds. For instance, a share could include a first video feed from a forward-facing camera on a head-mounted display (HMD), and a second video feed from a camera on the HMD that is facing inward towards the wearer's face. As another example, a share could include multiple audio feeds for stereo audio or spatially-localized audio providing surround sound.

In some implementations, a server may allow a viewer to participate in a voice chat that is associated with the experience-sharing session in which they are a viewer. For example, a server may support a voice chat feature that allows viewers and/or the sharer in an experience-sharing session to enter an associated voice-chat session. The viewers and/or the sharer who participate in a voice-chat session may be provided with a real-time audio connection with one another, so that each of those devices can play out the audio from all the other devices in the session. In an exemplary embodiment, the serving system supporting the voice-chat session may sum or mix the audio feeds from all participating viewers and/or the sharer into a combined audio feed that is output to all the participating devices. Further, in such an embodiment, signal processing may be used to minimize noise when audio is not received from a participating device (e.g., when the user of that device is not speaking). Further, when a participant exits the chat room, that participant's audio connection may be disabled. (Note however, that they may still participate in the associated experience-sharing session.) This configuration may help to create the perception of an open audio communication channel.

In a further aspect, a server could also support a video-chat feature that is associated with an experience-sharing session. For example, some or all of the participants in a video chat could stream a low-resolution video feed. As such, participants in the video chat may be provided with a view of a number of these low-resolution video feeds on the same screen as the video from a sharer, along with a combined audio feed as described above. For instance, low-resolution video feeds from viewers and/or the sharer could be displayed to a participating viewer. Alternatively, the supporting server may determine when a certain participating device is transmitting speech from its user, and update which video or videos are displayed based on which participants are transmitting speech at the given point in time.

In either scenario above, and possibly in other scenarios, viewer video feeds may be formatted to capture the users themselves, so that the users can be seen as they speak. Further, the video from a given viewer or the sharer may be processed to include a text caption including, for example, the name of a given device's user or the location of device. Other processing may also be applied to video feeds in a video chat session.

In some embodiments, a video chat session may be established that rotates the role of sharer between different participating devices (with those devices that are not designated as the sharer at a given point in time acting as a viewer.) For example, when a number of wearable computers are involved in a rotating-sharer experience-sharing session, the supporting server system may analyze audio feeds from the participating wearable computers to determine which wearable computer is transmitting audio including the associated user's speech. Accordingly, the server system may select the video from this wearable computer and transmit the video to all the other participating wearable computers. The wearable computer may be de-selected when it is determined that speech is no longer being received from it. Alternatively, the wearable computer may be de-selected after waiting for a predetermined amount of time after it ceases transmission of speech.

In a further aspect, the video from some or all the wearable computers that participate in such a video chat session may capture the experience of the user that is wearing the respective wearable computer. Therefore, when a given wearable computer is selected, this wearable computer is acting as the sharer in the experience-sharing session, and all the other wearable computers are acting as viewers. Thus, as different wearable computers are selected, the role of the sharer in the experience-sharing session is passed between these wearable computers. In this scenario, the sharer in the experience-sharing session is updated such that the user who is speaking at a given point in time is sharing what they are seeing with the other users in the session.

In a variation on the above-described video-chat application, when multiple participants are acting a sharers and transmitting a share, individual viewers may be able to select which share they receive, such that different viewers may be concurrently receiving different shares.

In another variation on the above-described video-chat application, the experience-sharing session may have a "directing viewer" that may select which shares or shares will be displayed at any given time. This variation may be particularly useful in an application of a multi-sharer experience-sharing session, in which a number of viewers are all transmitting a share related to a certain event. For instance, each member of a football team could be equipped with a helmet-mounted camera. As such, all members of the team could act as sharers in a multi-sharer experience-sharing session by transmitting a real-time video feed from their respective helmet-mounted cameras. A directing viewer, could then select which video feeds to display at a given time. For example, at a given point in time, the directing viewer might select a video feed or feeds from a member or members that are involved in a play that is currently taking place.

In a further aspect of such an embodiment, the supporting server system may be configured to resolve conflicts if multiple devices transmit speech from their users simultaneously. Alternatively, the experience-sharing session interface for participants may be configured to display multiple video feeds at once (i.e., to create multiple simultaneous sharers in the experience-sharing session). For instance, if speech is received from multiple participating devices at once, a participating device may divide its display to show the video feeds from some or all of the devices from which speech is simultaneously received.

In a further aspect, a device that participates in an experience-sharing session, may store the share or portions of the share for future reference. For example, in a video-chat implementation, a participating device and/or a supporting server system may store the video and/or audio that is shared during the experience-sharing session. As another example, in a video-chat or voice-chat session, a participating device and/or a supporting server system may store a transcript of the audio from the session.

a. Exemplary Server System Architecture

FIG. 1 is a simplified diagram of a sharing device, according to an exemplary embodiment. In particular, FIG. 1 shows a wearable computer 100 that is configured to serve as the sharer in an experience-sharing session. It should be understood, however, that other types of computing devices may be configured to provide similar sharing-device functions and/or may include similar components as those described in reference to wearable computer 100, without departing from the scope of the invention.

As shown, wearable computer 100 includes a head-mounted display (HMD) 106, several input sources 134, a data processing system, and a transmitter/receiver 102. FIG. 1 also indicates that a communicative link 142, could be established between the wearable computer 100 and a network. Further, the network could connect to a server 122 and one or more viewers 112A, 112B, and 112C through additional connections 162, 152A, 152B, and 152C.

An exemplary set of input sources 134 are shown in FIG. 1 as features of the wearable computer including: a video camera 114, a microphone 124, a touch pad 118, a keyboard 128, one or more applications 138, and other general sensors 148 (e.g. biometric sensors). The input sources 134 may be internal, as shown in FIG. 1, or the input sources 134 may be in part or entirely external. Additionally, the input sources 134 shown in FIG. 1 should not be considered exhaustive, necessary, or inseparable. Exemplary embodiments may exclude any of the exemplary set of input devices 134 and/or include one or more additional input devices that may add to an experience-sharing session.

The exemplary data processing system 110 may include a memory system 120, a central processing unit (CPU) 130, an input interface 108, and an audio visual (A/V) processor 104. The memory system 120 may be configured to receive data from the input sources 134 and/or the transmitter/receiver 102. The memory system 120 may also be configured to store received data and then distribute the received data to the CPU 130, the HMD 106, a set of one or more speakers 136, or to a remote device through the transmitter/receiver 102. The CPU 130 may be configured to detect a stream of data in the memory system 120 and control how the memory system distributes the stream of data. The input interface 108 may be configured to process a stream of data from the input sources 134 and then transmit the processed stream of data into the memory system 120. This processing of the stream of data converts a raw signal, coming directly from the input sources 134 or A/V processor 104, into a stream of data that other elements in the wearable computer 100, the viewers 112, and the server 122 can use. The A/V processor 104 may be configured perform audio and visual processing on one or more audio feeds from one or more microphones 124 and on one or more video feeds from one or more video cameras 114. The CPU 130 may be configured to control the audio and visual processing performed on the one or more audio feeds and the one or more video feeds. Examples of audio and video processing techniques, which may be performed by the A/V processor 104, will be given later.

The transmitter/receiver 102 may be configured to communicate with one or more remote devices through the communication network 132. Each connection made to the network (142, 152A, 152B, 152C, and 162) may be configured to support two-way communication and may be wired or wireless.

The HMD 106 may be configured to display visual objects derived from many types of visual multimedia, including video, text, graphics, pictures, application interfaces, and animations. In some embodiments, one or more speakers 136 may also present audio objects. Some embodiments of an HMD 106 may include a visual processor 116 to store and transmit a visual object to a physical display 126, which actually presents the visual object. The visual processor 116 may also edit the visual object for a variety of purposes. One purpose for editing a visual object may be to synchronize displaying of the visual object with presentation of an audio object to the one or more speakers 136. Another purpose for editing a visual object may be to compress the visual object to reduce load on the display. Still another purpose for editing a visual object may be to correlate displaying of the visual object with other visual objects currently displayed by the HMD 106.

While FIG. 1 illustrates a wearable computer configured to act as sharing device, it should be understood that a sharing device may take other forms. For example, a sharing device may be a mobile phone, a tablet computer, a personal computer, or any other computing device configured to provide the sharing device functionality described herein.

In general, it should be understood that any computing system or device described herein may include or have access to memory or data storage, which may take include a non-transitory computer-readable medium having program instructions stored thereon. Additionally, any computing system or device described herein may include or have access to one or more processors. As such, the program instructions stored on such a non-transitory computer-readable medium may be executable by at least one processor to carry out the functionality described herein.

Further, while not discussed in detail, it should be understood that the components of a computing device that serves as a viewing device in an experience-sharing session may be similar to those of a computing device that serves as a sharing device in an experience-sharing session. Further, a viewing device may take the form of any type of networked device capable of providing a media experience (e.g., audio and/or video), such as television, a game console, and/or a home theater system, among others.

b. Exemplary Device Architecture

Figure 2A:
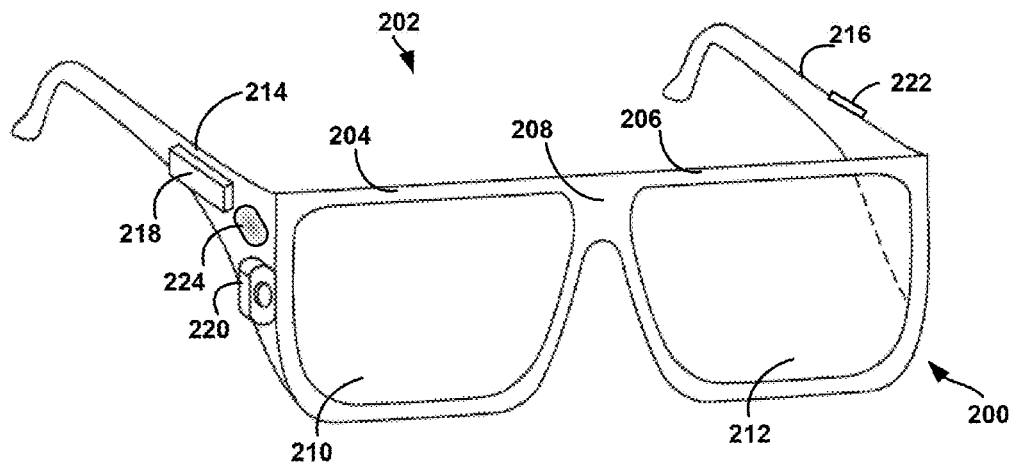
FIG. 2A illustrates an example of a wearable computing device.

FIG. 2A illustrates an example of a wearable computing device. While FIG. 2A illustrates a head-mounted device 202 as an example of a wearable computing device, other types of wearable computing devices could additionally or alternatively be used. As illustrated in FIG. 2A, the head-mounted device 202 comprises frame elements including lens-frames 204, 206 and a center frame support 208, lens elements 210, 212, and extending side-arms 214, 216. The center frame support 208 and the extending side-arms 214, 216 are configured to secure the head-mounted device 202 to a user's face via a user's nose and ears, respectively.

Each of the frame elements 204, 206, and 208 and the extending side-arms 214, 216 may be formed of a solid structure of plastic and/or metal, or may be formed of a hollow structure of similar material so as to allow wiring and component interconnects to be internally routed through the head-mounted device 202. Other materials may be possible as well.

One or more of each of the lens elements 210, 212 may be formed of any material that can suitably display a projected image or graphic. Each of the lens elements 210, 212 may also be sufficiently transparent to allow a user to see through the lens element. Combining these two features of the lens elements may facilitate an augmented reality or heads-up display where the projected image or graphic is superimposed over a real-world view as perceived by the user through the lens elements.

The extending side-arms 214, 216 may each be projections that extend away from the lens-frames 204, 206, respectively, and may be positioned behind a user's ears to secure the head-mounted device 202 to the user. The extending side-arms 214, 216 may further secure the head-mounted device 202 to the user by extending around a rear portion of the user's head. Additionally or alternatively, for example, the system 200 may connect to or be affixed within a head-mounted helmet structure. Other possibilities exist as well.

The system 200 may also include an on-board computing system 218, a video camera 220, a sensor 222, and a finger-operable touch pad 224. The on-board computing system 218 is shown to be positioned on the extending side-arm 214 of the head-mounted device 202; however, the on-board computing system 218 may be provided on other parts of the head-mounted device 202 or may be positioned remote from the head-mounted device 202 (e.g., the on-board computing system 218 could be wire- or wirelessly-connected to the head-mounted device 202). The on-board computing system 218 may include a processor and memory, for example. The on-board computing system 218 may be configured to receive and analyze data from the video camera 220 and the finger-operable touch pad 224 (and possibly from other sensory devices, user interfaces, or both) and generate images for output by the lens elements 210 and 212.

The video camera 220 is shown positioned on the extending side-arm 214 of the head-mounted device 202; however, the video camera 220 may be provided on other parts of the head-mounted device 202. The video camera 220 may be configured to capture images at various resolutions or at different frame rates. Many video cameras with a small form-factor, such as those used in cell phones or webcams, for example, may be incorporated into an example of the system 200.

Further, although FIG. 2A illustrates one video camera 220, more video cameras may be used, and each may be configured to capture the same view, or to capture different views. For example, the video camera 220 may be forward facing to capture at least a portion of the real-world view perceived by the user. This forward facing image captured by the video camera 220 may then be used to generate an augmented reality where computer generated images appear to interact with the real-world view perceived by the user.

The sensor 222 is shown on the extending side-arm 216 of the head-mounted device 202; however, the sensor 222 may be positioned on other parts of the head-mounted device 202. The sensor 222 may include one or more of a gyroscope or an accelerometer, for example. Other sensing devices may be included within, or in addition to, the sensor 222 or other sensing functions may be performed by the sensor 222.

The finger-operable touch pad 224 is shown on the extending side-arm 214 of the head-mounted device 202. However, the finger-operable touch pad 224 may be positioned on other parts of the head-mounted device 202. Also, more than one finger-operable touch pad may be present on the head-mounted device 202. The finger-operable touch pad 224 may be used by a user to input commands. The finger-operable touch pad 224 may sense at least one of a position and a movement of a finger via capacitive sensing, resistance sensing, or a surface acoustic wave process, among other possibilities. The finger-operable touch pad 224 may be capable of sensing finger movement in a direction parallel or planar to the pad surface, in a direction normal to the pad surface, or both, and may also be capable of sensing a level of pressure applied to the pad surface. The finger-operable touch pad 224 may be formed of one or more translucent or transparent insulating layers and one or more translucent or transparent conducting layers. Edges of the finger-operable touch pad 224 may be formed to have a raised, indented, or roughened surface, so as to provide tactile feedback to a user when the user's finger reaches the edge, or other area, of the finger-operable touch pad 224. If more than one finger-operable touch pad is present, each finger-operable touch pad may be operated independently, and may provide a different function.

Figure 2B:
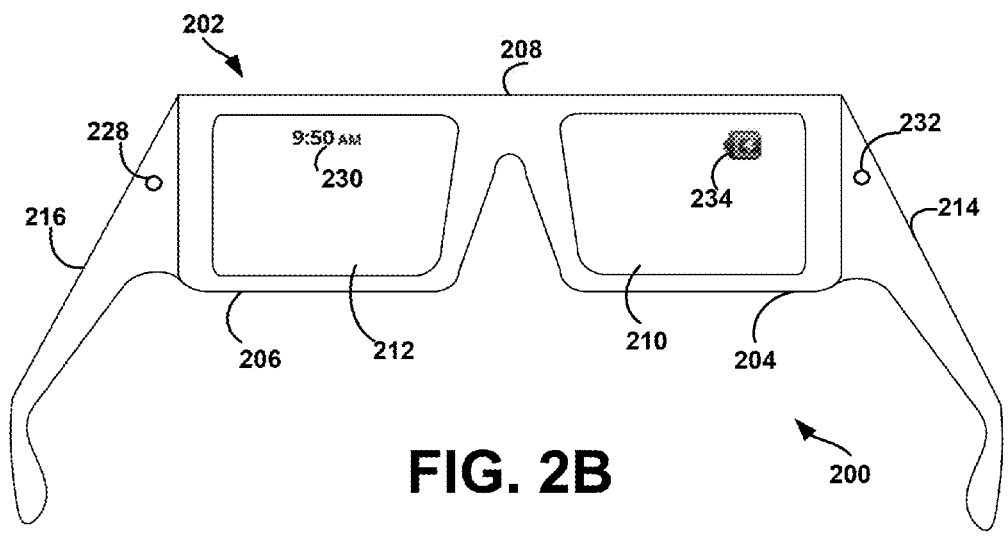
FIG. 2B illustrates an alternate view of the system 200 illustrated in FIG. 2A.

FIG. 2B illustrates an alternate view of the system 200 illustrated in FIG. 2A. As shown in FIG. 2B, the lens elements 210, 212 may act as display elements. The head-mounted device 202 may include a first projector 228 coupled to an inside surface of the extending side-arm 216 and configured to project a display 230 onto an inside surface of the lens element 212. Additionally or alternatively, a second projector 232 may be coupled to an inside surface of the extending side-arm 214 and configured to project a display 234 onto an inside surface of the lens element 210.

The lens elements 210, 212 may act as a combiner in a light projection system and may include a coating that reflects the light projected onto them from the projectors 228, 232. In some embodiments, a reflective coating may not be used (e.g., when the projectors 228, 232 are scanning laser devices).

In alternative embodiments, other types of display elements may also be used. For example, the lens elements 210, 212 themselves may include: a transparent or semi-transparent matrix display, such as an electroluminescent display or a liquid crystal display, one or more waveguides for delivering an image to the user's eyes, or other optical elements capable of delivering an in focus near-to-eye image to the user. A corresponding display driver may be disposed within the frame elements 204, 206 for driving such a matrix display. Alternatively or additionally, a laser or LED source and scanning system could be used to draw a raster display directly onto the retina of one or more of the user's eyes. Other possibilities exist as well.

Figure 2C:
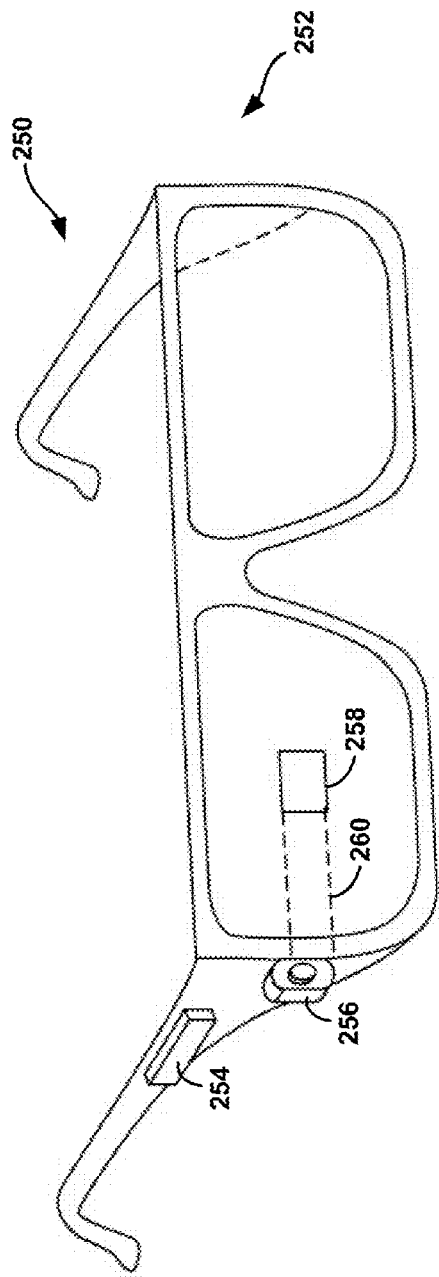
FIG. 2C illustrates an example system for receiving, transmitting, and displaying data.

FIG. 2C illustrates an example system for receiving, transmitting, and displaying data. The system 250 is shown in the form of a wearable computing device 252. The wearable computing device 252 may include frame elements and side-arms such as those described with respect to FIGS. 2A and 2B. The wearable computing device 252 may additionally include an on-board computing system 254 and a video camera 256, such as those described with respect to FIGS. 2A and 2B. The video camera 256 is shown mounted on a frame of the wearable computing device 252; however, the video camera 256 may be mounted at other positions as well.

As shown in FIG. 2C, the wearable computing device 252 may include a single display 258 which may be coupled to the device. The display 258 may be formed on one of the lens elements of the wearable computing device 252, such as a lens element described with respect to FIGS. 2A and 2B, and may be configured to overlay computer-generated graphics in the user's view of the physical world. The display 258 is shown to be provided in a center of a lens of the wearable computing device 252, however, the display 258 may be provided in other positions. The display 258 is controllable via the computing system 254 that is coupled to the display 258 via an optical waveguide 260.

Figure 2D:
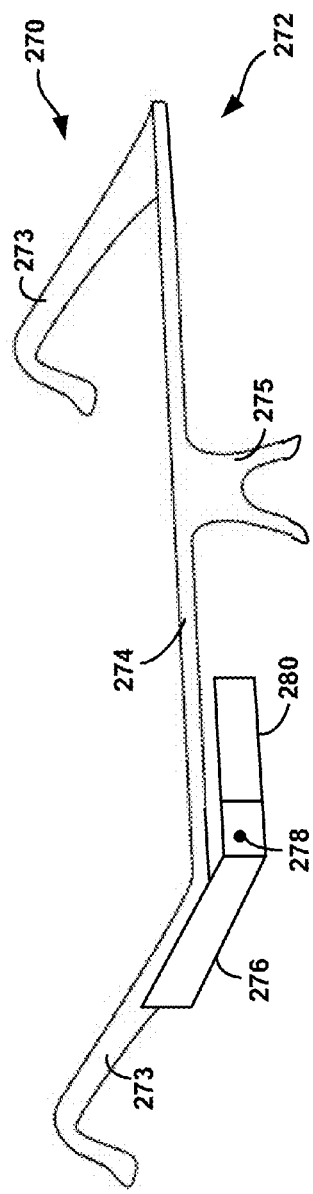
FIG. 2D illustrates an example system for receiving, transmitting, and displaying data.

FIG. 2D illustrates an example system for receiving, transmitting, and displaying data. The system 270 is shown in the form of a wearable computing device 272. The wearable computing device 272 may include side-arms 273, a center frame support 274, and a bridge portion with nosepiece 275. In the example shown in FIG. 2D, the center frame support 274 connects the side-arms 273. The wearable computing device 272 does not include lens-frames containing lens elements. The wearable computing device 272 may additionally include an on-board computing system 276 and a video camera 278, such as those described with respect to FIGS. 2A and 2B.

The wearable computing device 272 may include a single lens element 280 that may be coupled to one of the side-arms 273 or the center frame support 274. The lens element 280 may include a display such as the display described with reference to FIGS. 2A and 2B, and may be configured to overlay computer-generated graphics upon the user's view of the physical world. In one example, the single lens element 280 may be coupled to the inner side (i.e., the side exposed to a portion of a user's head when worn by the user) of the extending side-arm 273. The single lens element 280 may be positioned in front of or proximate to a user's eye when the wearable computing device 272 is worn by a user. For example, the single lens element 280 may be positioned below the center frame support 274, as shown in FIG. 2D.

As described in the previous section and shown in FIG. 1, some exemplary embodiments may include a set of audio devices, including one or more speakers and/or one or more microphones. The set of audio devices may be integrated in a wearable computer 202, 250, 270 or may be externally connected to a wearable computer 202, 250, 270 through a physical wired connection or through a wireless radio connection.

c. Cloud-Based Experience Sharing

In some exemplary embodiments a remote server may help reduce the sharer's processing load. In such embodiments, the sharing device may send the share to a remote, cloud-based serving system, which may function to distribute the share to the appropriate viewing devices. As part of a cloud-based implementation, the sharer may communicate with the server through a wireless connection, through a wired connection, or through a network of wireless and/or wired connections. The server may likewise communicate with the one or more viewers through a wireless connection, through a wired connection, or through a network of wireless and/or wired connections. The server may then receive, process, store, and/or transmit both the share from the sharer and comments from the viewers.

Figure 3A:
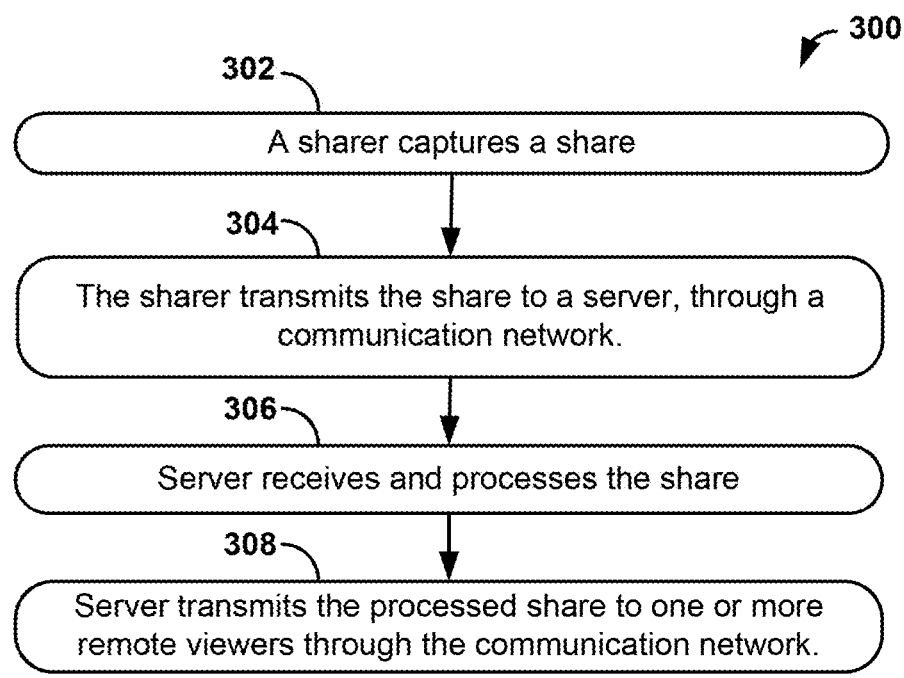
FIG. 3A is a flow chart illustrating a cloud-based method, according to an exemplary embodiment.

FIG. 3A is a flow chart illustrating a cloud-based method, according to an exemplary embodiment. In particular, method 300 may include the sharer capturing a share 302. Also, the sharer may transmit the share to a server through a communication network 304. Next, the server may receive and process the share 306. Then, the server may transmit the processed share to at least one viewer 308.

Figure 3B:
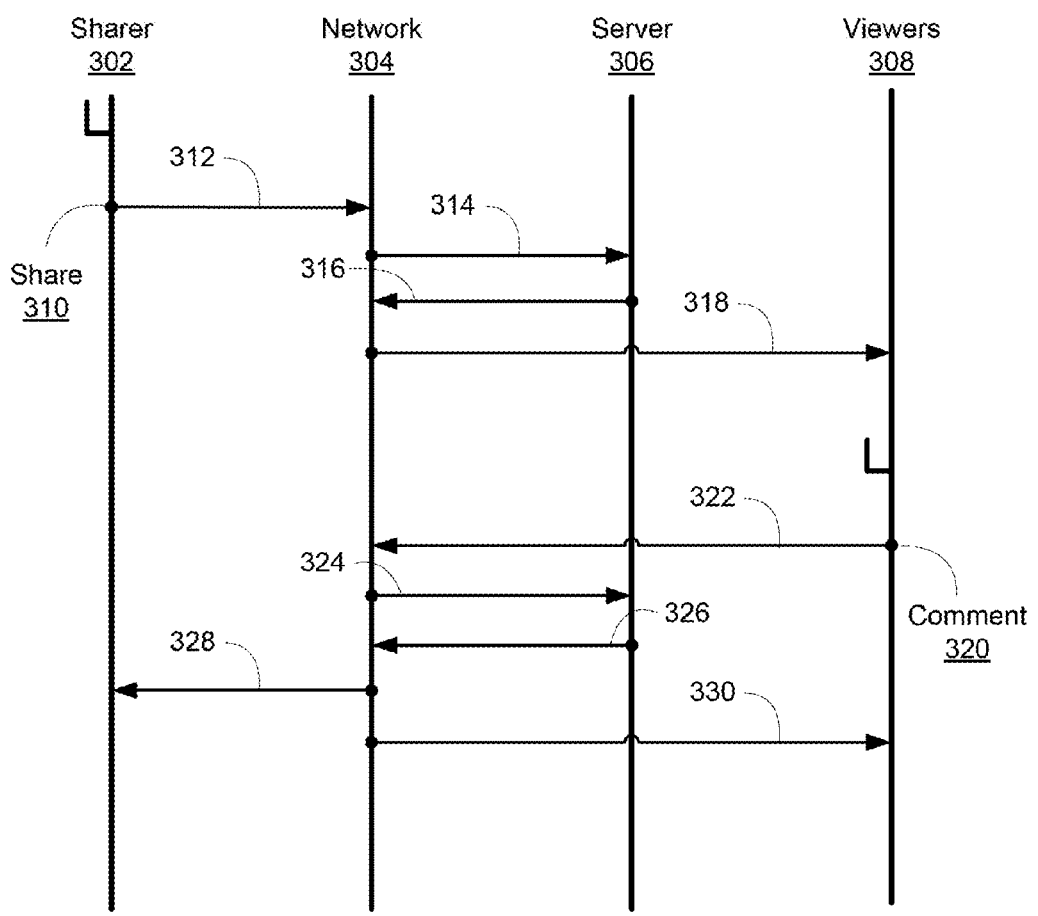
FIG. 3B shows an exemplary share-transmission path in a cloud-based experience-sharing session implementation.

FIG. 3B shows an exemplary share-transmission path in a cloud-based experience-sharing session implementation. As shown, a share 320 originates at the sharer 312. The sharer 312 may transmit 322 the share 320 to a network 314. The server 316 may then receive 324 the share from the network 314. The server 316 may process the share and transmit 326 the processed share back to the network 314 for distribution 328 to the viewers 318.

In some exemplary remote implementations, the server 316 may transmit (326 and 328) the share to the viewers 318 in real time. In another exemplary remote implementation, the server 316 may receive 324 a share 320 from the sharer 316, process the share, and then store the processed share for future retrieval by the viewers 318.

FIG. 3B also illustrates an exemplary comment-transmission path in a cloud-based experience-sharing session implementation. As shown, a comment 330 is created at the viewer 318. The viewer 318 may transmit 332 the comment 330 to the network 314. The server 316 may then receive 334 the comment from the network 314. The server 316 may process the comment and transmit 336 the processed comment back to the network 314 for distribution (338 and 330) to the sharer 312 and the viewers 318. This particular exemplary embodiment may not represent all or most cloud-based comment handling implementations, but is used as a reference transmission path.

An experience-sharing server may process a share in various ways before sending the share to a given viewer. For example, the server may format media components of a share to help adjust for a particular viewer's needs or preferences. For instance, consider a viewer that is participating in an experience-sharing session via a website that uses a specific video format. As such, when the share includes a video, the experience-sharing server may format the video in the specific video format used by the website before transmitting the video to this viewer. In another example, if a viewer is a PDA that can only play audio feeds in a specific audio format, the server may format an audio portion of a share in the specific audio format used by the PDA before transmitting the audio portion to this viewer. Other examples of formatting a share (or a portion of a share) for a given viewer are also possible. Further, in some instances, the ES server may format the same share in a different manner for different viewers in the same experience-sharing session.

Further, in some instances, an experience-sharing server may compress a share or a portion of a share before transmitting the share to a viewer. For instance, if a server receives a high-resolution share, it may be advantageous for the server to compress the share before transmitting it to the one or more viewers. For example, if a connection between a server and a certain viewer runs too slowly for real-time transmission of the high-resolution share, the server may temporally or spatially compress the share and send the compressed share to the viewer. As another example, if a viewer requires a slower frame rate for video feeds, a server may temporally compress a share by removing extra frames before transmitting the share to that viewer. And as another example, the server may be configured to save bandwidth by downsampling a video before sending the stream to a viewer that can only handle a low-resolution image. Additionally or alternatively, the server may be configured to perform pre-processing on the video itself, e.g., by combining multiple video sources into a single feed, or by performing near-real-time transcription (closed captions) and/or translation.

Yet further, an experiencing-sharing server may decompress a share, which may help to enhance the quality of an experience-sharing session. In some embodiments, to reduce transmission load on the connection between a sharer and a server, the sharer may compress a share before sending the share to the server. If transmission load is less of a concern for the connection between the server and one or more viewers, the server may decompress the share before sending it to the one or more viewers. For example, if a sharer uses a lossy spatial compression algorithm to compress a share before transmitting the share to a server, the server may apply a super-resolution algorithm (an algorithm which estimates sub-pixel motion, increasing the perceived spatial resolution of an image) to decompress the share before transmitting the share to the one or more viewers. In another implementation, the sharer may use a lossless data compression algorithm to compress a share before transmission to the server, and the server may apply a corresponding lossless decompression algorithm to the share so that the share may be usable by the viewer.

d. Exemplary Experience-Sharing Methods

An experience-sharing session may be initiated by one of several initiation techniques. For example, a sharer, a viewer, or an automated process may initiate an experience-sharing session. An experience-sharing session may be initiated in other ways as well.

The number and/or type of viewers in an experience-sharing session may vary according to the "session mode" of an experience-sharing session. Some exemplary session modes include: (a) a one-to-one mode, in which a single remote viewer receives a share; (b) a one-to-many mode, in which a group of remote viewers receive the share; and (c) a broadcast mode, in which the share is broadcast to a website (such as YouTube) where it can be viewed by anyone who is able to access the website. Further, in some embodiments, an experience-sharing session may involve a many-to-broadcast mode, or in other words, a particular group of participants acting as broadcast-mode sharers to broadcast their collective experience. Note that an example of a many-to-broadcast mode experience-sharing session is provided by the above example where all the members of a football team are sharers in an experience-sharing session. Other examples are also possible. Further, other session modes are also possible.

Figure 4:
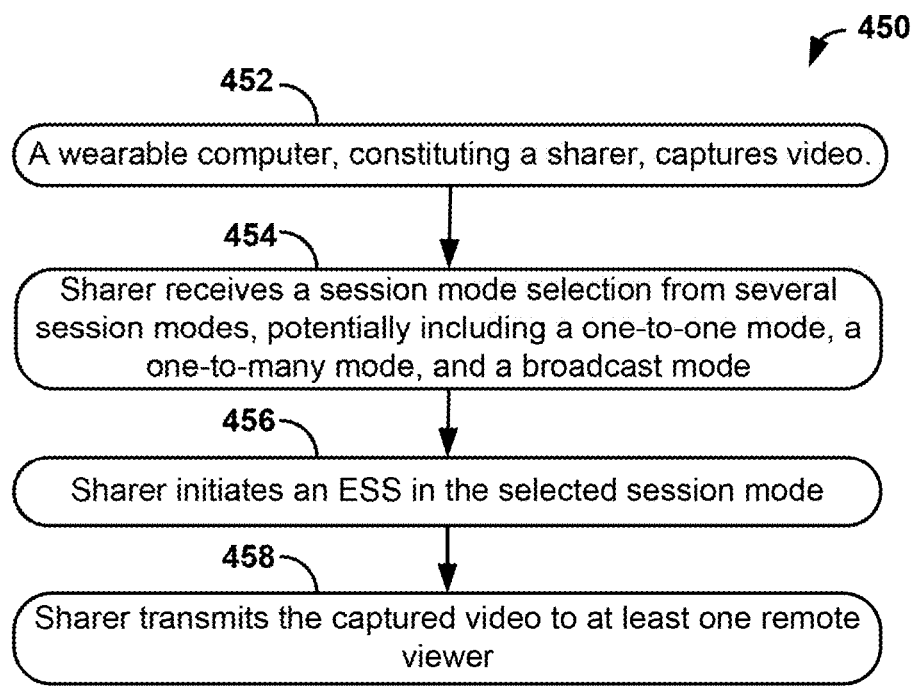
FIG. 4 is a flow chart illustrating an initiation method for an experience-sharing session, according to an exemplary embodiment.

FIG. 4 is a flow chart illustrating an initiation method for an experience-sharing session, according to an exemplary embodiment. The initiation method 450 may involve a sharer, such as a wearable computer, capturing a video, as shown by block 452. Further, this sharer may receive a session mode, selected from several session modes, including a one-to-one mode, a one-to-many mode, and a broadcast mode, as shown by block 454. Next, the sharer may initiate an experience-sharing session in the selected session mode, as shown by block 456. Then, the sharer may transmit the captured video to at least one remote viewer, as shown by block 458.

In a further aspect, when an experience-sharing session is initiated, a sharer may place restrictions on which viewers can join and/or participate in the experience-sharing session. For example, a sharer may enforce copyright restrictions on the content in the share. In this case, viewers must conform to distribution restrictions pertaining to the copyrighted material when accessing the share. As a further example, a sharer may only share a particular experience with geographically-nearby viewers. Another sharer may only invite viewers associated with users in a corresponding social network. Other types of restrictions are also possible. Further, such restrictions may be placed on an experience-sharing session in scenarios other than during initiation of the experience-sharing session.

In another aspect, the manner in which an experience-sharing session is initiated, and/or what device(s) and/or system(s) are involved in the initiation of an experience-sharing session, may depend on the desired type of experience-sharing session, and possibly other factors as well.

Exemplary initiation procedures will now be described in reference to various session modes, and in particular, to a one-to-one session mode, to a one-to-many session mode, and to a broadcast session mode.

i. One-to-One Session Mode

As stated above, a sharer may initiate a one-to-one experience-sharing session between the sharer and a single viewer. A one-to-one experience-sharing session may be initiated in several ways.

For example, a sharer may initiate a one-to-one experience-sharing session by sending out an invitation to a particular user. Upon receiving an acceptance of the invitation from a viewer associated with the particular user, the sharer may begin a one-to-one experience-sharing session with the viewer.

As another example, a sharer may initiate a one-to-one experience-sharing session and by specifying that only one viewer should be allowed to join the experience-sharing session at a time (without identifying the specific user or viewer that can join). As such, the sharer may set specific criteria to limit the identity of viewers that are allowed to join the one-to-one experience-sharing session, and then accept a viewer that meets the criteria on a first-come first-serve basis. Criteria for the viewer in a one-to-one session may include geographic, demographic, contextual, social-network based, or other user-defined viewer criteria. A viewer may join the experience-sharing session if the viewer meets the criteria set by the sharer and if another viewer is not already viewing the experience-sharing session. As an alternative to pre-setting viewer criteria, the sharer may manually accept viewers by receiving a request from a prospective viewer, presenting the request, and receiving instructions to allow or deny the request.

As yet another example, a sharer may initiate a one-to-one experience-sharing session by sending out an invitation to a viewer, receiving an acceptance of the invitation, and then beginning an experience-sharing session with an assigned session mode of one-to-one. The invitation and the acceptance of the invitation may be in a form which best suits the device type of the viewer. Hence, the invitation may be an e-mail, VoIP message, a micro-blog post, or video conference request if the viewer is a desktop computer, while the invitation may be a voice call, video chat, or text message if the viewer is a cell phone. Many other invitation types may be used depending on the device type of the viewer and/or the preferences set on the sharer.

Alternatively, a prospective viewer may initiate a one-to-one experience-sharing session by sending a prospective sharer a request to initiate an experience-sharing session. Upon receiving acceptance of the invitation, the sharer may begin a one-to-one experience-sharing session with the viewer. As in a sharer-initiated one-to-one experience-sharing session, the invitation in a viewer-initiated one-to-one experience-sharing session may take different forms depending on the device type of the viewer. The sharer may also present the invitation in a variety of ways, which may include displaying of text, pictures and/or graphics; playing a voice message or audio alert; and/or invoking a physical alert (e.g. vibration). The input to accept the invitation may include audio commands received by a microphone or physical sensing from a touchpad, button, actuator, or switch. Alternatively, a sharer may allow a user to prescribe and modify settings to automatically accept or decline experience-sharing session invitations from all or selected prospective viewers.

Another exemplary technique may involve a prospective sharer or a prospective viewer initiating a one-to-one experience-sharing session while engaged in a different form of communication with the other. To elaborate, if a sharer and a viewer (or in a remote implementation: a server and a viewer) each host a communication application, and the communication applications are compatible, an invitation to initiate a one-to-one experience-sharing session may be sent while the viewer and the sharer are already communicatively linked through the communication application. If a prospective sharer sends the invitation, the communication application hosted by the prospective sharer may then receive an acceptance of the invitation and respond to the acceptance of the invitation by initiating a one-to-one experience-sharing session with the viewer. If the prospective viewer sends the invitation within the communication application, the communication application hosted by the prospective sharer may then present the invitation, receive an acceptance of the invitation, and respond to the acceptance of the invitation by initiating a one-to-one experience-sharing session with the viewer.

ii. One-to-Many Session Mode

As indicated previously, a sharer may initiate a one-to-many experience-sharing session between the sharer and one or more viewers. A one-to-many experience-sharing session may be initiated by any of several initiation techniques. Once initiated, the sharer may provide for a viewer or set of viewers to join or leave the one-to-many experience-sharing session.

For example, a sharer may initiate an experience-sharing session and assign the experience-sharing session a session mode of one-to-many, optionally including a maximum allowed number of viewers. Further, the sharer may set specific criteria to limit the identity of viewers that are allowed to join the one-to-many experience-sharing session. Criteria may include geographic, demographic, contextual, social-network based, or other user-defined viewer criteria. A viewer may join the experience-sharing session if the viewer meets the criteria set by the sharer and if the allowed maximum number of viewers has not been reached. As an alternative to pre-setting viewer criteria, the sharer may manually accept viewers by receiving a request from a prospective viewer, presenting the request to a user, and receiving instructions to allow or deny the request.

In another exemplary initiation procedure, a sharer may initiate a one-to-many experience-sharing session by sending out invitations to a set of prospective viewers, receiving at least one acceptance of the invitation, and then beginning an experience-sharing session with an assigned session mode of one-to-many. The invitation and the acceptance of the invitation may be in a form which best suits the device type of each viewer. Hence, one invitation may be an e-mail, VoIP message, micro-blog post, or video conference request if one prospective viewer is a desktop computer, while another invitation may be a voice call, video chat, or text message if another prospective viewer is a cell phone. Upon receipt of an acceptance of an invitation, the sharer may immediately begin a one-to-many experience-sharing session or the sharer may wait for additional acceptances of invitations or for other reasons.

Alternatively, a first prospective viewer may initiate a one-to-many experience-sharing session by sending out a first invitation to a sharer and a set of other invitations to one or more other prospective viewers. The prospective sharer may then present the first invitation and, upon receiving input to accept the invitation, begin a one-to-many experience-sharing session with at least the first prospective viewer. The prospective sharer may also receive an acceptance of an invitation from the set of other invitations. As in a sharer-initiated one-to-many experience-sharing session, the invitations in a viewer-initiated one-to-many experience-sharing session may take different forms depending on the device types of the first prospective viewer and the device types of the other prospective viewers. The sharer may also present the invitation in a variety of ways, which may include: displaying of text, pictures and/or graphics; playing a voice message or audio alert; and/or invoking a physical alert (e.g. vibration). The input to accept the invitation may include audio commands received by a microphone or physical sensing from a touchpad, button, actuator, or switch. Alternatively, a sharer may allow a user to prescribe and modify settings to automatically accept or decline experience-sharing session invitations from all or selected prospective viewers.

Another exemplary technique may involve a prospective sharer or a prospective viewer initiating a one-to-many experience-sharing session while engaged in a different form of communication with the other. To elaborate, if a prospective sharer and a first viewer (or in a remote implementation: a server and a first viewer) each host a communication application, and the communication applications are compatible, a set of invitations to initiate a one-to-many experience-sharing session may be sent while the first viewer and the prospective sharer are already communicatively linked through the communication application. If the prospective sharer sends the set of invitations to the first prospective viewer and other prospective viewers, the communication application being hosted by the prospective sharer may then receive one or more acceptances of an invitation from the set of invitations and respond to the one or more acceptances of an invitation by initiating a one-to-many experience-sharing session. If the prospective viewer sends a first invitation to the prospective sharer and a set of other invitations to other prospective viewers within the communication application, the communication application being hosted by the prospective sharer may then present the first invitation, receive an acceptance of the first invitation, and respond to the acceptance of the first invitation by initiating a one-to-one experience-sharing session with the first prospective viewer. The communication application hosted by the prospective sharer may also receive at least one acceptance of an invitation from the set of other invitations.

Still another exemplary initiation technique for a one-to-many experience-sharing session may involve an existing experience-sharing session, with a session mode other than one-to-many, being modified to become a one-to-many experience-sharing session. For example, the sharer or the original viewer of an existing experience-sharing session with a session mode of one-to-one may send out a set of invitations to other prospective viewers and, in response to the sharer receiving an acceptance of at least one of the set of invitations, modifying the existing experience-sharing session by changing the session mode to one-to-many and continuing the existing experience-sharing session with the original viewer and with other viewers that have accepted one of the set of invitations. Alternatively, the sharer of the existing experience-sharing session with a session mode of one-to-one may, in response to the sharer receiving an acceptance of at least one of the set of invitations, terminate the existing experience-sharing session and begin a new one-to-many experience-sharing session with the original viewer and with other viewers that have accepted one of the set of invitations.

While a one-to-many experience-sharing session continues, the one or more viewers may change in both number and identity. Such changes may occur through a current viewer leaving the one-to-many experience-sharing session or through a prospective viewer joining the one-to-many experience-sharing session.

One exemplary technique for a current viewer to leave a one-to-many experience-sharing session may be sharer-initiated. In a sharer-initiated leaving, a sharer may stop sending the share to a selected viewer either as a result of the sharer receiving instructions from an input device to the stop sending the share to the selected viewer, or as a result of an automated reaction to existing preferences. As an example, a sharer may present a list of current viewers in a one-to-many experience-sharing session, receive a command to discontinue experience sharing with a selected set of viewers, and in response to the command continue the one-to-many experience-sharing session with only viewers not included in the selected set of viewers. Optionally, a sharer may also send a notification to the selected set of viewers to indicate a discontinuation of involvement the one-to-many experience-sharing session.

A second exemplary technique for a current viewer to leave a one-to-many experience-sharing session may be viewer-initiated. A viewer-initiated case may include the sharer receiving an indication that a certain viewer is no longer receiving the share or receiving an indication that the certain viewer no longer wishes to receive the share, and in response to the indication the sharer ceasing transmission of the share to the certain viewer. An unintentional leaving (e.g. connection lost, viewer device turns off, etc.) may also be categorized as viewer-initiated, since a response to an unintentional leaving would likely be similar to that of the viewer-initiated case.

One exemplary procedure for a viewer to join a one-to-many experience-sharing session may be prospective-viewer-initiated. The initiation process may include the sharer of a current one-to-many experience-sharing session: receiving a request from a prospective viewer to participate in the current one-to-many experience-sharing session; receiving an acceptance of the request either from an input device or from an automated process; and, responsive to the acceptance, including the prospective viewer as a viewer in the one-to-many experience-sharing session.

Another exemplary procedure for a viewer joining a one-to-many experience-sharing session may be sharer-initiated. A sharer-initiated experience-sharing session may include a sharer of an existing one-to-many experience-sharing session: sending an invitation to participate in the current one-to-many experience-sharing session to a prospective viewer, receiving an indication that the prospective viewer has accepted the invitation, and in response to the acceptance including the prospective viewer as a viewer in the current one-to-many experience-sharing session.

A third exemplary procedure for a new viewer joining a one-to-many experience-sharing session may be current-viewer-initiated. Such an initiation procedure may include an existing viewer of an current one-to-many experience-sharing session sending an invitation to participate in the current one-to-many experience-sharing session to a prospective viewer; the sharer of the current one-to-many experience-sharing session receiving an indication that the prospective viewer has accepted the invitation; the sharer presenting the indication in the form of a request to participate from the prospective viewer; the sharer receiving an acceptance of the request either from an input device or from an automated process; and, responsive to the acceptance, including the prospective viewer as a viewer in the current one-to-many experience-sharing session.

An exemplary one-to-many experience-sharing session may contain continuance procedures so that the changing characteristics of the one or more viewers may not adversely affect the one-to-many experience-sharing session. For example, a sharer may have initiated a one-to-many experience-sharing session by sending out ten invitations to ten prospective viewers, receiving four acceptances from four prospective viewers, receiving one rejection from one prospective viewer, receiving no indications from five prospective viewers, and beginning the one-to-many experience-sharing session with the four prospective viewers. Later, all of the four prospective viewers may discontinue involvement in the one-to-many experience-sharing session, leaving zero current viewers. A sharer may apply a technique to continue capturing and processing the share, despite the zero current viewers, in anticipation that the sharer may eventually receive acceptances from one or more of the five prospective viewers that were initially unresponsive. Alternatively, a sharer may apply a technique which terminates a one-to-many experience-sharing session with zero current viewers and then initiates a new one-to-many experience-sharing session if the sharer receives an acceptance of an invitation.

Throughout a one-to-many experience-sharing session, the sharer may receive indications of the number and identities of the current set of one or more viewers.

iii. Broadcast Session Mode

A sharer may also initiate an experience-sharing session a share in a broadcast mode, in which the share is broadcast to a website (such as YouTube) where it can be viewed by anyone who is able to access the website. A broadcast experience-sharing session may be initiated by user-input to the sharer, an automated process on the sharer, or transition from an existing non-broadcast experience-sharing session.

The sharer may initiate a broadcast experience-sharing session in response to received user-input. In some embodiments, the sharer may transmit instructions to the website before starting the experience-sharing session to prepare the website for receiving the share. Some procedures may also include the sharer receiving an indication that the website is prepared for the broadcast experience-sharing session before beginning the broadcast experience-sharing session with the website. Additionally, some initiation procedures may include sending notifications to one or more prospective viewers, informing the prospective viewers of the broadcast experience-sharing session. In such procedures, notifications may take many forms including, but not limited to, SMS messages, voice messages, micro-blog posts, video conference requests, voice calls, and/or other types of messages.

If an automated process initiates a broadcast experience-sharing session, an exemplary initiation process may include an application on the sharer responding to a user-defined event and in response presenting an invitation to the sharer to begin a broadcast experience-sharing session. After the sharer receives the invitation from the application, if a positive response is received from an input device, then the sharer may begin a broadcast experience-sharing session with the website. As with the sharer-initiated broadcast experience-sharing session, the sharer may transmit preparation instructions to the website, transmit notifications to prospective viewers, and/or postpone initiation until an indication of readiness is received from the website. In some embodiments, the application may transmit instructions to a website to prepare for a potential broadcast experience-sharing session at the same time that the sharer presents the invitation. In this way, the application may shorten the initiation time by parallelizing the steps of website preparation and receiving an invitation response.

Another exemplary initiation procedure for a broadcast experience-sharing session may involve a sharer modifying an existing experience-sharing session, with a session mode other than broadcast, to create a broadcast experience-sharing session. For example, the sharer of an existing one-to-many experience-sharing session may initiate a sharer-initiated broadcast experience-sharing session, send invitations to the viewers of the one-to-many experience-sharing session to join the broadcast experience-sharing session, and transmit the share to both the sharer-initiated broadcast experience-sharing session and the existing one-to-many experience-sharing session. In some procedures, the sharer may also terminate the existing one-to-many experience-sharing session either as a result of a sufficient number of viewers leaving the existing one-to-many experience-sharing session or as a result of another event (e.g. timer expiration, bandwidth restriction). In a sharer-modified initiation, the sharer may modify the existing experience-sharing session without presenting each step to the HMD, giving the impression that the existing experience-sharing session seamlessly transitioned from one session mode to the broadcast mode.

Once a broadcast experience-sharing session is initiated, the sharer may capture, process, and transmit the share to the website. Prospective viewers may then seek access to the website in order to participate in the broadcast experience-sharing session. Depending on the nature of the website and the preferences on the sharer, the sharer may receive indications about the viewers of the broadcast experience-sharing session.

In addition to general restrictions placed on users by the website, the sharer may send additional criteria to use in limiting which viewers are invited to or allowed to access a broadcast experience-sharing session. Limiting criteria may include geographic, demographic, contextual, social-network based, or other user-defined viewer data.

One deviation from general comment handling procedures in a broadcast experience-sharing session from the general comment handling procedures is that the sharer may receive the comments from the website, as opposed to directly from the viewers. Therefore, the website may rank and filter the comments from the viewers of a broadcast experience-sharing session before transmitting the comments to the sharer, allowing for minimal processing by the sharer or a server. In some embodiments, the website may also present comments from viewers either as indicated by automatic ranking procedures, by viewer ranking, or by input received from the sharer.

The website of a broadcast experience-sharing session may be any website that can receive and display a share. In practice, the website may actually represent multiple websites or web servers. Additionally, an exemplary website may not necessarily handle all portions of a share. For instance, a website configured to present video feeds but not configured to present audio feeds may receive a share consisting only of a video feed. In some embodiments, the sharer of a broadcast experience-sharing session may format the share for the specific website before transmitting the share to the website. In other embodiments, the website may format the share after receiving the share from the sharer. In still other embodiments, the sharer and the website may each format the same share before and after transmission, respectively.

Depending on how the website of a broadcast experience-sharing session is configured, the sharer may receive and display information from the website about the one or more viewers. Exemplary information about the viewers may include the number of viewers currently accessing the broadcast experience-sharing session and the identity of specific viewers. For example, one exemplary embodiment may include the sharer of a broadcast experience-sharing session displaying a number that represents a real-time number of viewers accessing the broadcast experience-sharing session. As another example, the website and sharer of a broadcast experience-sharing session may each host a social networking application in which the sharer is associated with a first user-profile. Then, if one or more of the viewers of the broadcast experience-sharing session are associated with other user-profiles of the social networking application, the website may present the identities of the one or more viewers to the sharer if the first profile is identified to be connected to the other user-profiles.

e. Experience Sharing Website

In a further aspect, an experience-sharing website may aggregate shares from many experience-sharing sessions and provide viewers with a convenient interface for accessing and/or participating in experience-sharing sessions.

In some embodiments, an experience-sharing website may allow users to browse and/or search active experience-sharing sessions (and possibly to browse and/or search an archive of past experience-sharing sessions. Further, to facilitate search functionality, an experience-sharing server may perform indexing of experience-sharing sessions, categorizing of experience-sharing sessions, and other functions to organize the experience-sharing sessions for search.

In some instances, an experience-sharing website may allow a user to view low-resolution versions of multiple shares in a single screen. For example, low-resolution and/or low frame-rate video feeds, or periodic photographs from a sharer's camera, may be presented for a number of shares simultaneously. Other examples are also possible.

In some embodiments, an experience-sharing server may provide access to a certain category or type of experience-sharing session via a "channel" on an experience-sharing website. Such a channel may provide access to a number of experience-sharing sessions having different sharers, which are related in some manner. With access to such a channel, a viewer can more-easily switch between related experience-sharing sessions. Additionally or alternatively, an experience-sharing server may analyze some or all shares on a given channel, and create a combined experience-sharing feed, which may be accessed via an experience-sharing website. The combined feed may show some or all the shares at once, or may intelligently and automatically switch between shares from the channel.

It should be understood that the above-described features of an experience-sharing website are provided for illustrative purposes and should not be construed as limiting.

Experience Sharing in Social Networks

A user of a wearable computing device can use experience sharing, in which an audience of one or more remote viewers is able to receive streaming video and/or audio that is captured on and wirelessly transmitted from the wearable computing device, to provide status updates in social networking applications. Further, a social networking website may provide functionality that allows viewers to easily locate their friends' experience shares, and participate in a friend's experience share.

In some embodiments, a server system that hosts a social network application may include or coordinate with an experience-sharing server to receive a share from a sharer such as a wearable computing device. Provided with this functionality, a user may log on to their social-network account via their sharing device, and initiate an experience-sharing session that is accessible via the social-networking website. The user may then specify, via an experience-sharing application on their sharing device, that the experience-sharing session should be accessible to a viewer or viewers via the social-networking website.

When the user makes the experience-sharing session accessible, an experience-sharing application on their sharing device may provide options so that the user can specify how their share can be accessed and/or who can access their share. For instance, an experience-sharing session may be accessible via the user's profile page, via a search engine on the experience-sharing website, or via other functions of the experience-sharing website. Further, the user may specify who can become a viewer in the experience-sharing session. For example, the user may specify that only a certain friend or friends should be able to join the experience-sharing session as a viewer. As another example, a given user may specify that an experience-sharing session should be accessible to: (a) a certain subset of friends, (b) a certain group of friends, (c) all of the given user's friends, (d) a group of users on the social network (regardless of whether a user in the group is a friend of the given user), (e) all users on the social network (regardless of whether a user is a friend of the given user), or (f) anyone (regardless of whether the user is a registered member of the social network).

Access to Experience Sharing Via a Social Networking Website

Figure 5A:
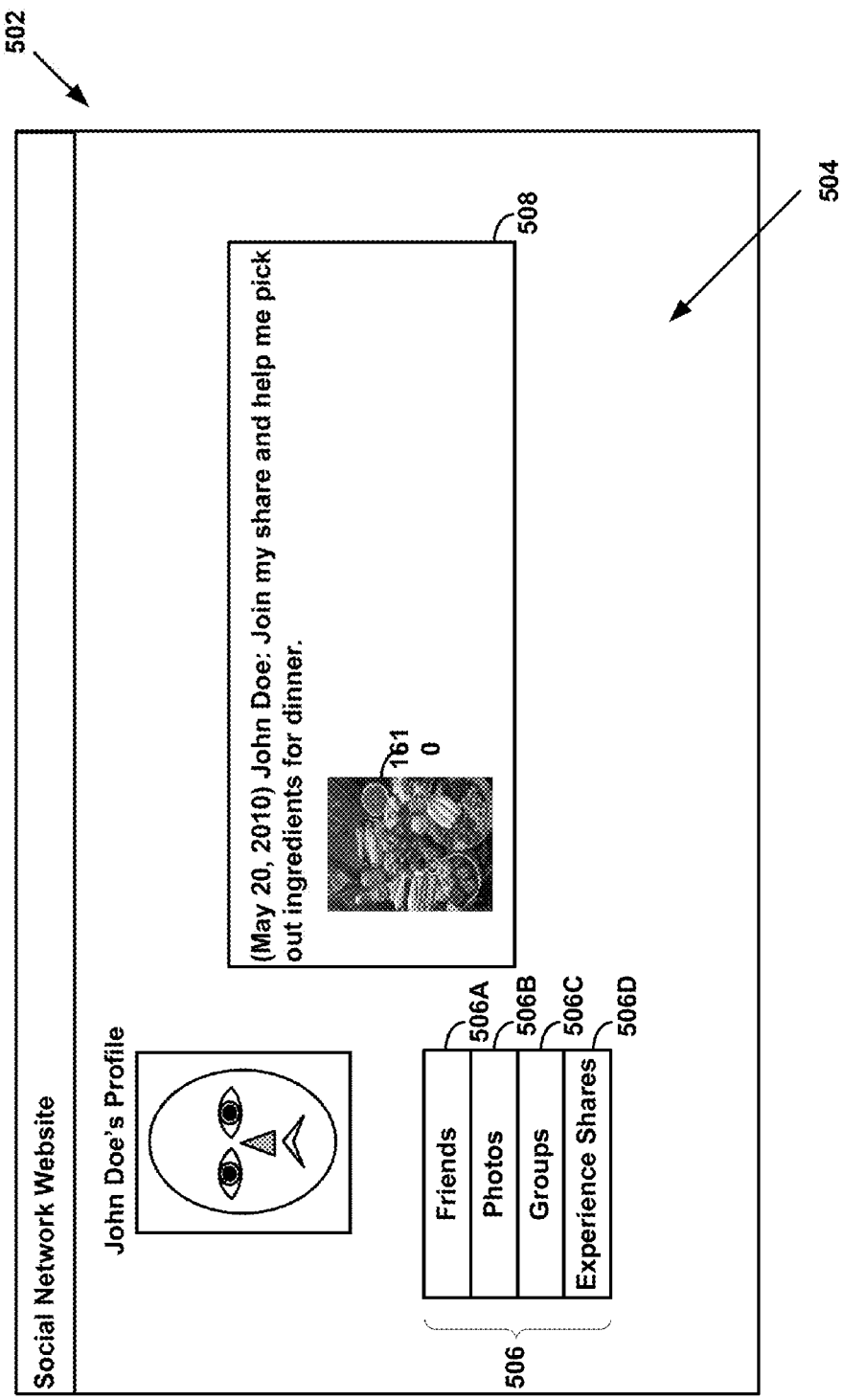
FIG. 5A is a block diagram illustrating a social network website according to an exemplary embodiment.

FIG. 5A is a block diagram illustrating a social network website according to an exemplary embodiment. As shown, social network website 502 is displaying a user profile page 504 for the user "John Doe."

The profile page 504 includes a number of links 506 to other pages related to John Doe's social-network account. In particular, Friends link 506A may provide access to a list of John Doe's friends in the social network, Photos link 506B may provide access to a page with photos that include John Doe, Groups link 506C may provide access to list of the social network's groups that have been joined by John Doe, and Experience Shares link 506D may provide access to page for browsing a number of different experience shares that John Doe can join as a viewer via the social network website 502.

The profile page 504 also includes a posting 508 with a share preview 510 of a share by John Doe. The share preview 510 may be, for example, a live video feed captured by a point-of-view (POV) camera on John Doe's wearable computer (e.g., a video feed portion of a share by John Doe). By posting the share preview 510 to his profile page 504, John Doe makes the corresponding share accessible via profile page 504. In particular, a user may view the corresponding share by visiting John Doe's profile page 504 and clicking on the share preview 510.

Since a user who visits profile page 504 may visit the page for a reason other than viewing a share by John Doe, an experience-sharing server may format John Doe's share into share preview 510 so as to conserve bandwidth and/or make share preview 510 less distracting to someone visiting profile page 504 for another reason. For instance, share preview 510 may include video from John Doe's share that is formatted for presentation as thumbnail-sized video in posting 508. As such, share preview 510 may simply be a low-resolution version of video from John Doe's share. Additionally or alternatively, the video from the share may be displayed at a low frame rate in share preview 510 (e.g., 1 frame/second). In addition, while John Doe's share may include audio as well as video, the audio portion of the share may not be played to a viewer of profile page 504.

When a viewer wishes to participate more fully in an experience-sharing session, the viewer may be able to select the share preview 510 to begin receiving a larger-sized video display at a higher frame rate (and possibly with audio as well). To facilitate this functionality, the social-networking server may coordinate with the experience-sharing server to initiate an experience-sharing session between the John Doe's wearable computing device and the remote viewer who is participating in the session via social-networking website 502.

Figure 5B:
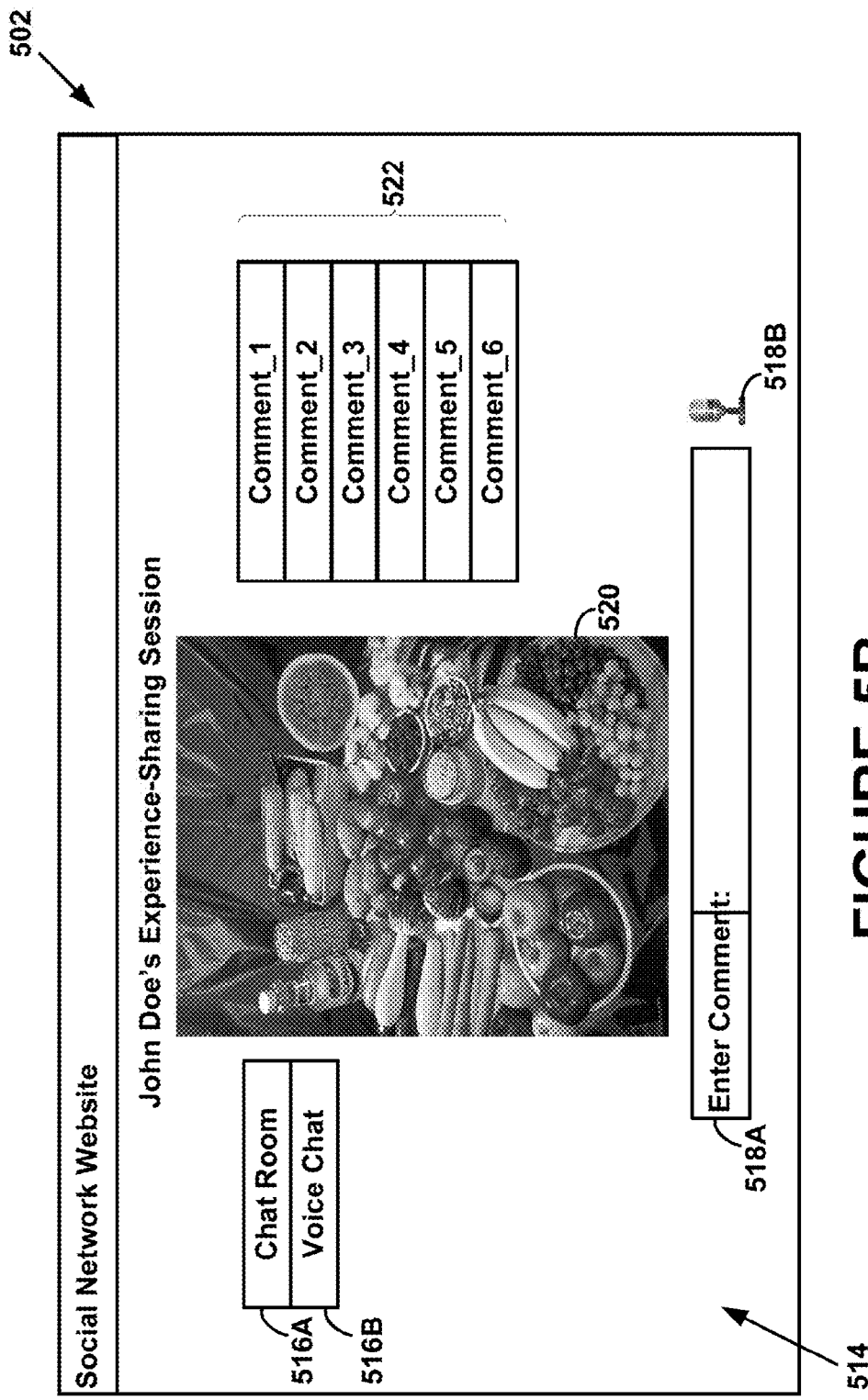
FIG. 5B is a block diagram illustrating a viewer page for participating in an experience-sharing session via a social-networking website, according to an exemplary embodiment.

FIG. 5B is a block diagram illustrating a viewer page for participating in an experience-sharing session via a social-networking website, according to an exemplary embodiment. In particular, experience-sharing session viewer page 514 may be accessed by clicking on share preview 510. Provided with access to experience-sharing session viewer page 514, a viewer may view the video 520 from John Doe's share at a higher quality than the video in share preview 510 (e.g., higher resolution and/or higher frame rate).

In a further aspect, a viewer page on a social-networking site may allow a viewer to participate in an experience-sharing session in an interactive manner. In the illustrated example, viewer page 514 includes various features that allow a viewer to participate in John Doe's experience-sharing session. For example, by selecting chat room button 516A, a viewer may enter a text-based chat room with other viewers in the experience-sharing session and/or the sharer in the experience-sharing session (e.g., John Doe). Similarly, by selecting voice chat button 516B, a viewer may enter a voice-based chat room with other viewers in the experience-sharing session and/or the sharer in the experience-sharing session. The viewer may also enter text-based comments related to the share in comment field 518A and/or record audio comments by selecting microphone icon 518B. Further, the viewer's comments, comments from other viewers, and/or reply comments or requests for comments by the sharer (e.g., by John Doe) may be displayed in comment list 522.

More generally, a viewer page such as viewer page 514, or any other interface via which a viewer can participate in an experience-sharing session, may allow for interactive participation in various ways and/or via various different modalities. For example, an experience-sharing server and/or a social-networking server may support a viewer and/or a sharer communicating via text, graphics, audio, and/or video.

Figure 5C:
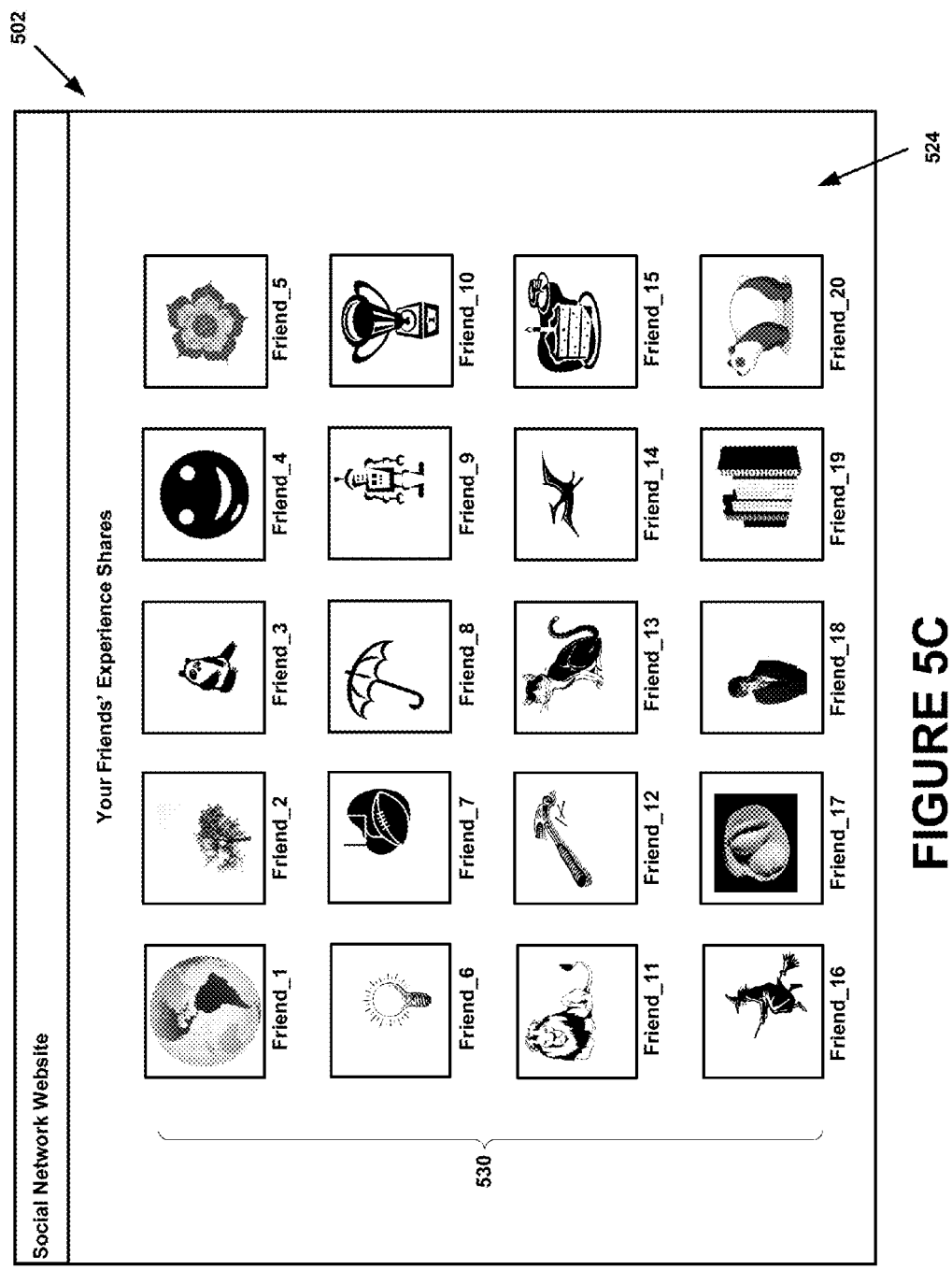
FIG. 5C is a block diagram illustrating a browser page for browsing experience-sharing sessions via a social-networking website, according to an exemplary embodiment.

Referring back to FIG. 5A, when someone viewing profile page 514 selects Experience Shares link 506D, they may be taken to a browser page of social-networking website 502. For example, FIG. 5C is a block diagram illustrating a browser page for browsing experience-sharing sessions via a social-networking website, according to an exemplary embodiment. In particular, a user may access browser page 524 to browse those experience-sharing sessions that they are able to join via social-networking website 502.

As shown, the social-networking website 502 display a number of share previews 530 in browser page 524. The share previews 530 may be formatted in a similar manner as share preview 510, or may be formatted in another manner. Further, the share previews 530 may provide links to experience-sharing sessions that have been initiated by multiple different sharers, such as by multiple wearable computing devices and/or other devices.

An experience-sharing session browser page may display share previews 530 in various arrangements. In the arrangement illustrated by browser page 524, the share previews are arranged in a "grid" format. The share previews may also be arranged in a "dashboard" format or another arranged in another manner altogether.

When a given user access browser page 524, the social-networking server may determine which experience-sharing sessions should be available to the given user (e.g., which experience-sharing sessions to display share previews for) by accessing the given user's account with the social network, and determining which experience-sharing sessions the given user can join as a viewer via the with the social-networking website 502. In an alternative embodiment, it is also possible that some or all of the share previews 530 may be linked to experience-sharing sessions established by users that are not within the given user's social network (e.g., other users that the given user is not "friends" with). For example, the share previews 530 may include share previews for broadcast-mode experience-sharing sessions initiated by sharers that are not within the given user's social network.

In a further aspect, the social-networking server may determine which share previews should be displayed and/or determine the order in which the share previews should be displayed in browser page 524 based on various factors that tend to indicate the relative importance of the shares to the user. For example, the social-networking server and/or the experience-sharing server may rank the experience-sharing sessions that are accessible to a given user based on factors such as the user's social network (e.g., whether the given user is friends with the user operating the sharing device, how often the given user communicates with the user operating the sharing device, etc.), the proximity of the user operating the sharing device to the given user, user preferences of the given user, and/or other factors. Other examples are also possible.

As noted, share preview 510 and/or share previews 530 may take the form of low-resolution and/or low frame-rate video feeds from an experience-sharing session. In general, an experience-sharing server and/or a social-networking server may be configured to format video from various shares for such lower-quality share previews.

In an alternative embodiment, video portions of shares may not need to be formatted for low-quality share previews by the experience-sharing server or by the social-networking server. Instead, when a sharing device initiates an experience-sharing session, the sharing device may itself provide low-resolution video that is appropriate for a share preview. In such an embodiment, when a viewer joins the experience-sharing session and requests a higher-quality version of the share, the experience-sharing server and/or the social-networking server may notify the sharing device so that the sharing device may then increase the quality of share. Doing so may help to conserve network resources and/or processing resources of the sharing devices, in the event that there is some downtime between when the sharing device initiates an experience-sharing session and when a viewer joins the experience-sharing session. Other alternative embodiments are also possible.

As noted above, an experience-sharing session viewer page 524 may include a voice chat button 516B that allows a viewer to participate in a voice chat that is associated with the experience-sharing session in which they are a viewer. More generally, an experience-sharing server and/or a social-networking server may support such voice chat functionality in other interfaces of social-networking website 502, and even in non-social networking configurations (e.g., viewers accessing an experience-sharing session from their mobile phone or a stand-alone application in a web browser or on a personal computer).

For example, an experience-sharing server and/or a social-networking server (or possibly another type of cloud-based server system) may support a voice chat feature that allows viewers and/or the sharer in an experience-sharing session to enter an associated voice-chat session. The viewers and/or the sharer who participate in a voice-chat session may be provided with a real-time audio connection with one another, so that each of those devices can play out the audio from all the other devices in the session. In an exemplary embodiment, the serving system supporting the voice-chat session may sum or mix the audio feeds from all participating viewers and/or the sharer into a combined audio feed that is output to all the participating devices. Further, in such an embodiment, signal processing may be used to minimize noise when audio is not received from a participating device (e.g., when the user of that device is not speaking). Further, when a participant exits the chat room, that participant's audio connection may be disabled. (Note however, that they may still participate in the associated experience-sharing session.) This configuration may help to create the perception of an open audio communication channel.

In a further aspect, an experience-sharing server and/or a social-networking server (or possibly another type of cloud-based server system) could also support a video-chat feature that is associated with an experience-sharing session. For example, some or all of the participants in a video chat could stream a low-resolution video feed. As such, participants in the video chat may be provided with a view of a number of these low-resolution video feeds on the same screen as the video from a sharer, along with a combined audio feed as described above. For instance, low-resolution video feeds (not shown) from viewers and/or the sharer could be displayed to a participating viewer who is accessing viewer page 514. Alternatively, the supporting server system may determine when a certain participating device is transmitting speech from its user, and update which video or videos are displayed based on which participants are transmitting speech at the given point in time.

In either scenario above, and possibly in other scenarios, the low-resolution video feed may be formatted in a resolution that can be displayed as a "thumbnail," and/or may have a low frame-rate, in a similar manner as described in reference to share previews. However, unlike the video in a share preview, which typically captures the experience that is seen by a user, a video feed in a video chat session may capture the user, so that the user can be seen as they speak. Further, the video from a given viewer or the sharer may be processed to include a text caption including, for example, the name of given device's user or the location of device. Other processing may also be applied to video feeds in a video chat session.

In some embodiments, a video chat session may be established that rotates the role of sharer between different participating devices (with those devices that are not designated as the sharer at a given point in time acting as a viewer. For example, when a number of wearable computers are involved in a rotating-sharer experience-sharing session, the supporting server system may analyze audio feeds from the participating wearable computers to determine which wearable computer is transmitting audio including the associated user's speech. Accordingly, the server system may select the video from this wearable computer and transmit the video to all the other participating wearable computers. The wearable computer may be de-selected when it is determined that speech is no longer being received from it. Alternatively, the wearable computer may be de-selected after waiting for a predetermined amount of time after it ceases transmission of speech.

In a further aspect, the video from some or all the wearable computers that participate in such a video chat session may capture the experience of the user that is wearing the respective wearable computer. Therefore, when a given wearable computer is selected, this wearable computer is acting as the sharer in the experience-sharing session, and all the other wearable computers are acting as viewers. Thus, as different wearable computers are selected, the role of the sharer in the experience-sharing session is passed between these wearable computers. In this scenario, the sharer in the experience-sharing session is updated such that the user who is speaking at a given point in time is sharing what they are seeing with the other users in the session.

In a further aspect of such an embodiment, the supporting server system may be configured to resolve conflicts if multiple devices transmit speech from their users simultaneously. Alternatively, the experience-sharing session interface for participants may be configured to display multiple video feeds at once (i.e., to create multiple simultaneous sharers in the experience-sharing session). For instance, if speech is received from multiple participating devices at once, a participating device may divide its display to show the video feeds from some or all of the devices from which speech is simultaneously received.

In a further aspect, a device that participates in an experience-sharing session, such as a video chat, may store the share or portions of the share for future reference. For example, in a video-chat implementation, a participating device and/or a supporting server system may store the video and/or audio that is shared during the experience-sharing session. As another example, in a video-chat or voice-chat session, a participating device and/or a supporting server system may store a transcript of the audio from the session.

Implementation of Experience Sharing in a Location-Based Social-Networking Application I. Overview In a further aspect, experience-sharing sessions may be implemented in a location-based social-networking application. A location-based social-networking application may provide various social-networking functions that depend upon the geographic location or locations of a user's friends. For example, when a given user accesses a location-based social-networking application, the user may be presented with a map that is centered at the user's current geographic location. Further, the application may display icons on the map that indicate the respective geographic locations of friends that are located nearby.

The user may then interact with the icons on the map to initiate various actions with the corresponding friend, such as sending a message to the friend, posting on the friend's profile page, etc. Further, in an exemplary embodiment, the user may interact with an icon on the map to initiate an experience-sharing session with the corresponding friend.

In a further aspect, if a nearby friend of the user is involved in an experience-sharing session (as a sharer or possibly as a viewer), then the location-based social-networking application may display, for example, a share preview for the experience-sharing session, or another indication of that the friend is involved an experience-sharing session. As such, the map could that multiple share previews, which may correspond to different experience-sharing sessions. The user may then select an experience-sharing session in which their friend is participating, and join the experience-sharing session (if authorized to do so).

In a variation of the above example, share previews or other indications of experience-sharing sessions that involve nearby friends may be displayed in an arrangement other than on a map. For example, a social-networking application may display a list or a grid of share previews that includes share previews for a user's friends that are within a predetermined distance (e.g., five miles) from the user's geographic location.

It should be understood that the above-described examples of experience sharing in conjunction with location-based social networking, and social networking in general, are not intended to be limiting. Those skilled in the art will understand that many other examples of experience sharing in conjunction with social networking are also possible.

II. Experience-Sharing Methods for Location-Based Social Networking

A. Exemplary Client-Side Methods

Figure 6:
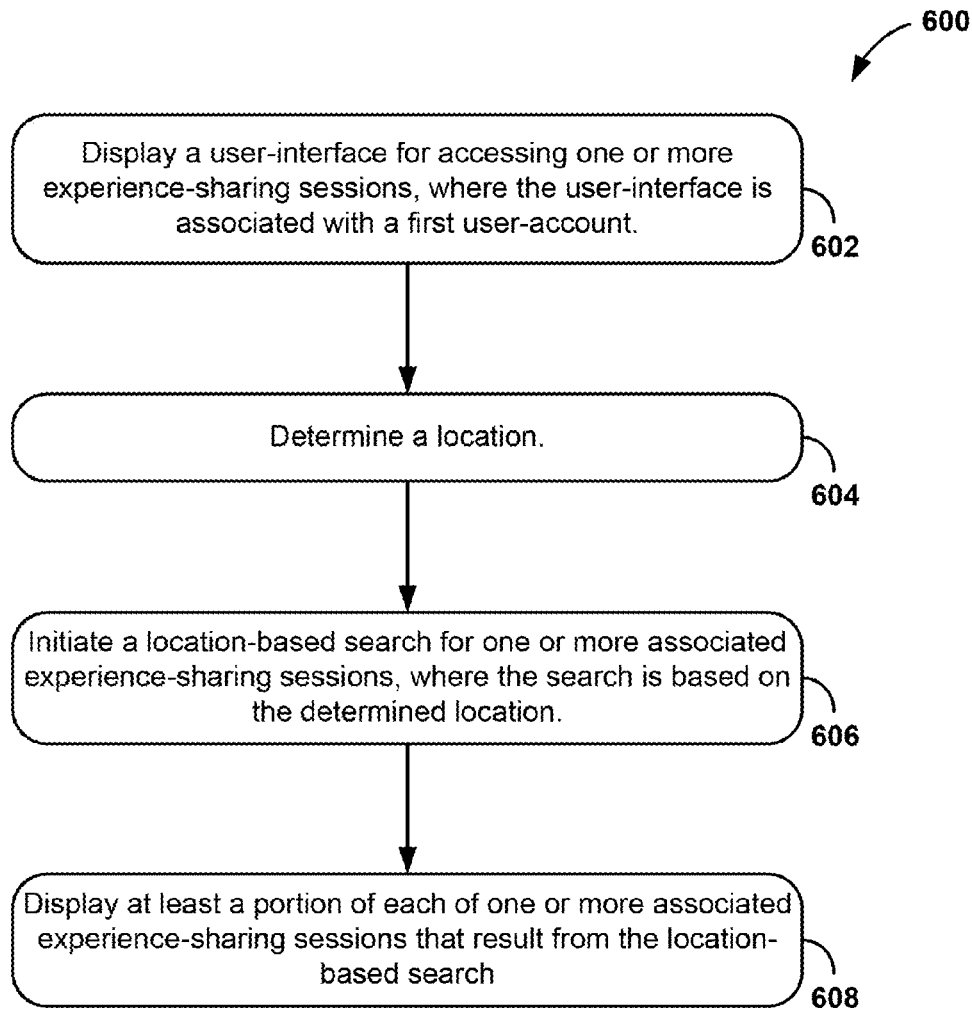
FIG. 6 is a flow chart illustrating a method according to an exemplary embodiment.

FIG. 6 is a flow chart illustrating a method according to an exemplary embodiment. Method 600 may be carried out by a computing device, which will typically be a client device such as a wearable computer, personal computer, or a mobile phone. The client may implement method 600 in order to browse experience-sharing sessions and/or to join an experience-sharing session (either as a sharer or a viewer, or as a hybrid sharer/viewer).

As shown by block 602, method 600 involves the computing device displaying a user-interface for accessing one or more experience-sharing sessions, where the user-interface is associated with a first user-account. The computing device then determines a location, as shown by block 604. Further, the computing device initiates a location-based search for one or more associated experience-sharing sessions, where the search is based on the determined location, as shown by block 606. In an exemplary embodiment, each associated experience sharing session involves at least one second user-account that has a confirmed association with the first user-account. The computing device may then display at least a portion of each of one or more associated experience-sharing sessions that result from the location-based search, as shown by block 608.

In an exemplary embodiment, the location-based search may be limited to associated experience-sharing sessions, which involve at least one user-account with a confirmed association with the first user-account. For example, when a user accesses the user-interface via their social-network account, the search may be limited to experience-sharing sessions that involve users at least one friend of the user, or at least one user having an account that is linked to the first user-account in some manner.

However, the location-based search may also be expanded to include experience-sharing sessions that don't involve any user-accounts that have a confirmed association with the first user-account. For example, an exemplary method may further involve receiving input data that indicates to include non-associated experience-sharing sessions in the location-based search. This input data may correspond to a user interaction with the user-interface, such as the user clicking on a share preview of an experience-sharing session, for example. In any such instance, the computing device may responsively include non-associated experience-sharing sessions when initiating the location-based search.

In a further aspect, at block 604, the computing device may determine the location in various ways. In an exemplary embodiment, the location may generally be associated with the first user-account. For example, the determined location may be the geographic location of the computing device, which may be determined using any technique (e.g., GPS, triangulation, etc.). In such an embodiment, the location-based search may accordingly involve a search for associated experience-sharing sessions that involve a second user-account that is within a predetermined distance from the determined location.

In some embodiments, the computing device may determine a type of location, rather than determining a specific geographic location. For example, exemplary method 100 may further involve the computing device determining a current location of the computing device. The computing device can then determine a location-type of the current location. For example, the computing device may determine that the user is at a particular type of location, such as in a park, at a movie theater, or at a sporting event, to provide just a few of the many possible examples.

When the computing device determines location-type, the location-based search may accordingly be based on the location-type. As such, the location-based search in an exemplary method 100 may further involve a search for associated experience-sharing sessions that involve a second user-account having an associated location of the same location-type as the current location. For example, if it is determined that the current location is at a coffee shop, the location-based search may search for experience-sharing sessions that involve a second user-account of user that is located in a coffee shop.

In such an embodiment, the location-based search may or may not take consider the proximity of the second user-accounts. For example, the search criteria for the search could specify that the search be limited to those experience-sharing sessions that involve a user in a coffee shop, and further, that the search results should be based on the proximity of such users to the geographic location associated with the first user-account (e.g., based on the distance between the geographic location of the computing device and the respective geographic locations of the devices via which the users are participating in the associated experience-sharing sessions). Alternatively, the search may return those experience-sharing sessions that involve a user in a coffee shop, without regard for the proximity of the user.

In some instances, the computing device may automatically determine the location (e.g., by using GPS and/or triangulation to determine a geographic location). In other instances, however, the computing device may receive input data, which may be supplied by the user, which indicates the location upon which to base the location-based search. As such, the user-interface may further include a feature that allows the user to provide a location for the location-based search.

B. Exemplary Server-Side Methods

Figure 7:
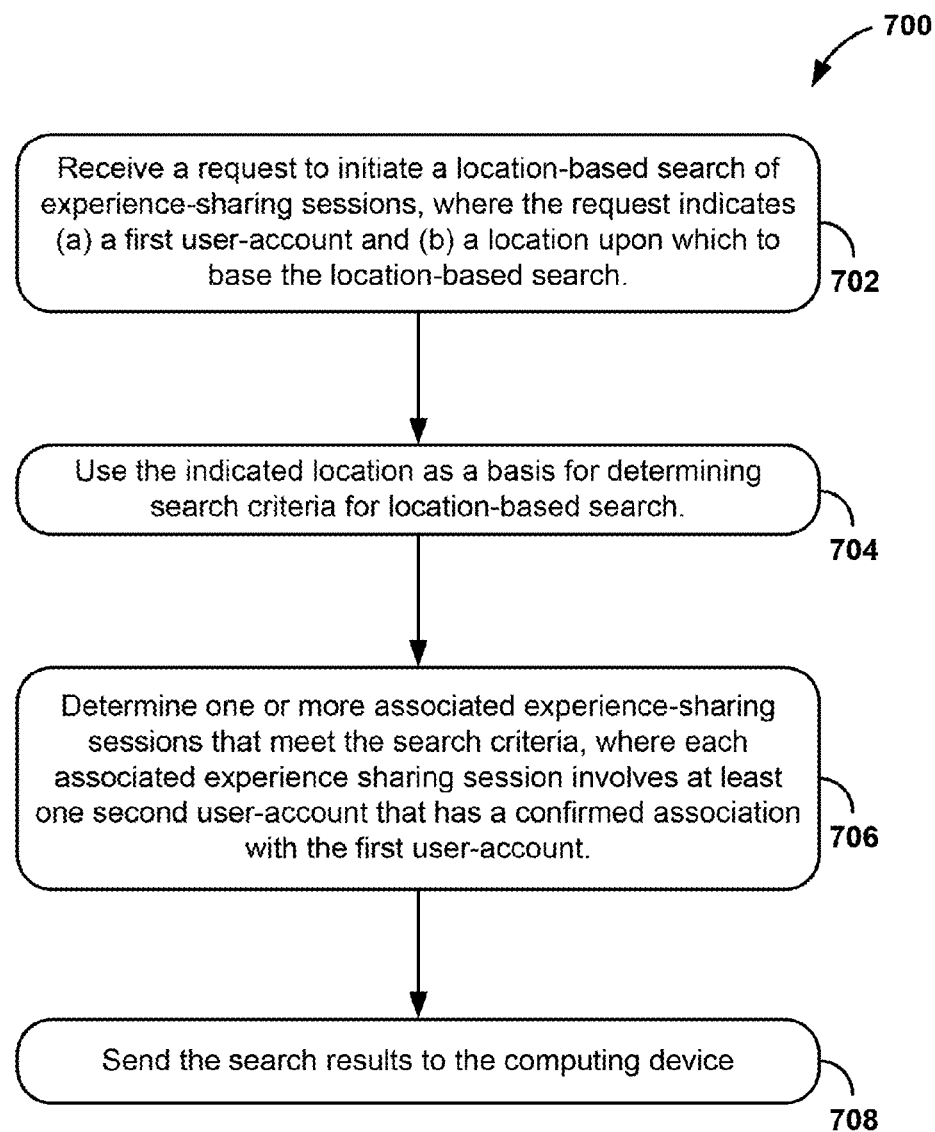
FIG. 7 is another flow chart illustrating a method according to an exemplary embodiment.

FIG. 7 is another flow chart illustrating a method according to an exemplary embodiment. Method 700 may be carried out by a computing system, which will typically be a server system (e.g., an experience-sharing server, a subsystem thereof, or an affiliated server system), but may take other forms as well. In an exemplary embodiment, the server system may implement method 700 to facilitate location-based experience sharing. Further, exemplary method 700 may be implemented by a server to facilitate a client device that is carrying out an exemplary method such as method 600.

More specifically, method 700 involves the server system receiving a request to initiate a location-based search of experience-sharing sessions, where the request indicates (a) a first user-account and (b) a location upon which to base the location-based search, as shown by block 702. The server system may responsively initiate the location-based search. In particular, the server system may use the indicated location as a basis for determining search criteria for the location-based search, as shown by block 704. The server system may then determine search results that include one or more associated experience-sharing sessions that meet the search criteria, where each associated experience sharing session involves at least one second user-account that has a confirmed association with the first user-account, as shown by block 706. The server system then sends the search results to the computing device, as shown by block 708.

In some embodiments, the search results may include or take the form of processed versions of the associated experience-sharing sessions or processed versions of certain portions of the associated experience-sharing sessions. For instance, exemplary method 700 may further involve the server system generating a share preview for each of one or more of the associated experience-sharing sessions. The generated share previews may be sent to the one or more share previews. In some embodiments, where a share previews includes video from an experience-sharing session that is reduced in size and/or frame rate, the server system may establish a connection with the computing device, so that the share preview may be streamed to the computing device in real time.

In a further aspect, the server system may be configured to handle a request to join one of the associated experience-sharing sessions. For example, method 700 may further involve the server system receiving a request from the computing device for the first user-account to join a given one of the associated experience-sharing sessions. In this case, the server system may responsively join the first user-account to the experience-sharing session and send a full-version of the associated experience-sharing session to the computing device. In some embodiments, the server may simply allow the first user-account to join the experience-sharing session without further verification. Alternatively, the server system may verify that the first determine whether or not the first user-account is authorized to join the associated experience-sharing session. If the first user-account is authorized, only then will the server system send the full-version of the associated experience-sharing session to the computing device.

C. Map-Based Implementation

In some embodiments, the user-interface for accessing experience-sharing sessions may include or take the form of a map. In such an embodiment, portions of associated experience-sharing sessions may be displayed on the map.

Figure 8:
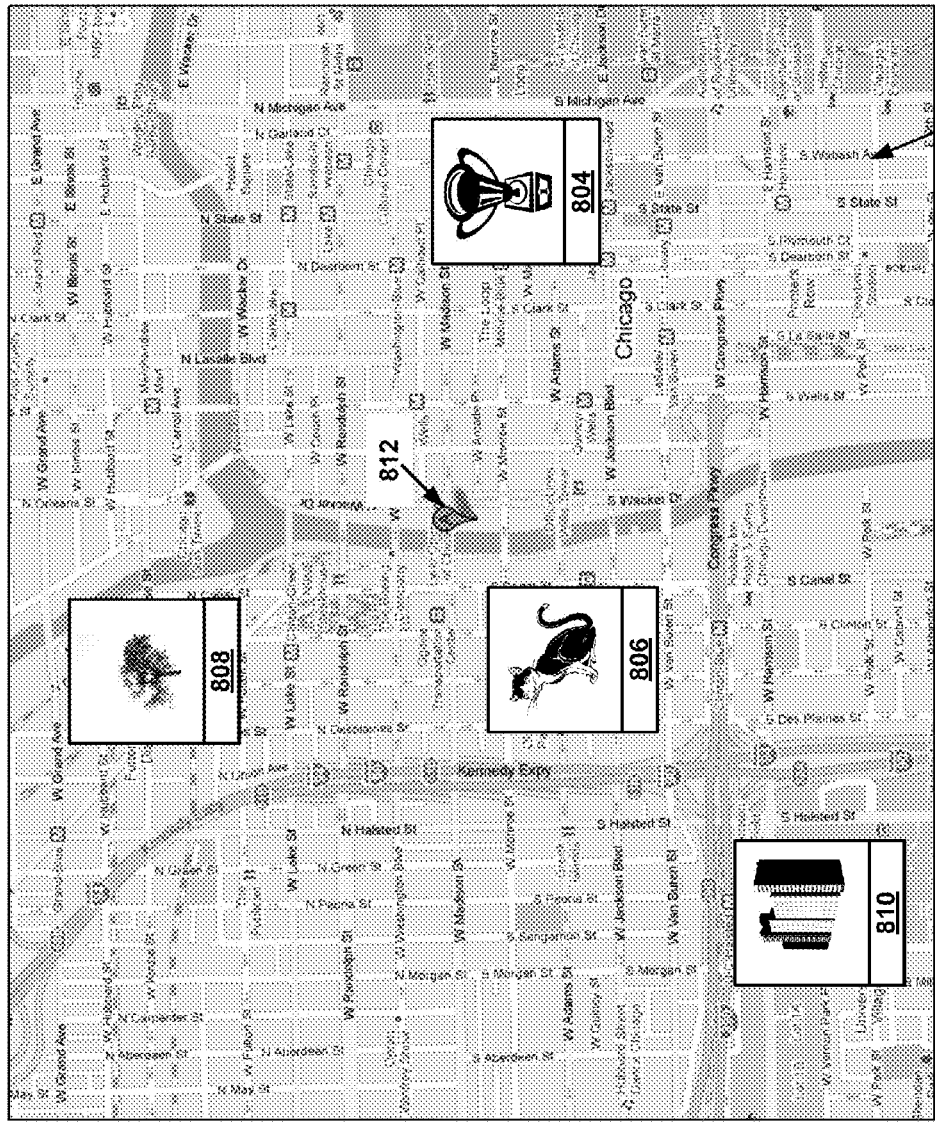
FIG. 8 is a simplified illustration of a user-interface for accessing experience-sharing sessions, according to an exemplary embodiment.

FIG. 8 is a simplified illustration of a user-interface for accessing experience-sharing sessions, according to an exemplary embodiment. In particular, user interface 800 includes a map 802 via which a user may access experience-sharing sessions. In the illustrated example, map 802 includes four share previews 804 to 810 for four experience sharing sessions. Further, while four share previews are shown, it should be understood that the number of experience-sharing sessions that are accessible via an exemplary interface may vary (and as such, the number of displayed share previews may vary in a corresponding manner).

In an exemplary embodiment share previews 804 to 810 may have been selected for display in map 802 using an exemplary method, such as method 600. In such an embodiment, share previews 804 to 810 may be selected for display in a location-based search. In a further aspect, when the location-based search is based on a geographic location, a graphic icon 812 may be displayed on map 802 at the geographic location upon which the search is based.

In a further aspect, share previews 804 to 810 may displayed at the respective location of the user who has a confirmed association with the first user is involved in the corresponding experience-sharing session. To facilitate this functionality, an exemplary method, such as method 600, may further involve determining a geographic location for each associated experience-sharing session. To do so, for example, the computing device may determine a location associated with the second user-account that is participating in the experience-sharing session and has a confirmed association to the first user-account (e.g., the location of the computing device via which the second user-account is participating in the experience-sharing session). The computing device may then display at least a portion of each associated experience-sharing session on the map at the determined geographic location. In the illustrated example, the displayed portion of each experience-sharing session is a share preview. The displayed portion may take other forms as well. It is also possible that a complete share may be displayed (e.g., if the share is video only).

In a further aspect of an exemplary embodiment, user-interface 800 may allow a user to access some or all of the experience-sharing sessions that corresponds to share previews 804 to 810. For example, a user may select the share preview (e.g., with a single or double mouse click, with a tap or gesture on a touchpad, etc.) in order to join the corresponding experience-sharing session.

CONCLUSION

It should be understood that for situations in which the embodiments discussed herein collect and/or use any personal information about users or information that might relate to personal information of users, the users may be provided with an opportunity to opt in/out of programs or features that involve such personal information (e.g., information about a user's preferences or a user's contributions to social content providers). In addition, certain data may be anonymized in one or more ways before it is stored or used, so that personally identifiable information is removed. For example, a user's identity may be anonymized so that no personally identifiable information can be determined for the user and so that any identified user preferences or user interactions are generalized (for example, generalized based on user demographics) rather than associated with a particular user.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

We claim:

1. A computer-implemented method comprising:
    displaying, by a first computing device, a user-interface on a graphic display, wherein the user-interface provides for simultaneous previews of a plurality of experience-sharing sessions, and wherein the user-interface is associated with a first user-account from a social network;
    determining, by the first computing device, a geographic location that is associated with the first user-account;
    initiating, by the first computing device, a location-based search within the social network for one or more associated experience-sharing sessions, wherein each associated experience sharing session corresponds to a second user-account from the social network, wherein the second user-account has a confirmed association with the first user-account, wherein at least one of the associated experience-sharing sessions comprises real-time point-of-view video captured by a camera on a head-mountable device (HMD) that is associated with one of the second user-accounts, and wherein the location-based search is based on the determined geographic location;
    displaying, in the user-interface, at least a portion of each of one or more associated experience-sharing sessions that result from the location-based search, wherein the displayed portion of each experience-sharing session comprises a low-resolution real-time image feed based on real-time image data generated by one of the second computing devices, and wherein the displayed portion of each associated experience-sharing session is displayed, in the user-interface, at a location on a map that is associated with the corresponding second user-account; and in response to a data input corresponding to the displayed portion of a first of the associated experience-sharing sessions, displaying a first interface for the first associated experience-sharing session on the graphic display, wherein the first interface comprises a high-resolution real-time image feed based on the real-time image data generated by the associated second computing device.

2. The method of claim 1, wherein the geographic location associated with the first user-account is a geographic location of the first computing device.

3. The method of claim 1, wherein the location-based search comprises a search for one or more associated experience-sharing sessions within a predetermined distance from the geographic location associated with the first user-account.

4. The method of claim 1, wherein determining a location associated with the first user-account comprises:
   determining a current geographic location of the computing device; and
   determining a location-type of the current geographic location.

5. The method of claim 4, wherein the location-based search comprises a search for one or more associated experience-sharing sessions that are at a location of the same location-type as the current geographic location.

6. The method of claim 1, wherein determining the geographic location comprises receiving input data that indicates the location.

7. The method of claim 1, wherein the method further comprises displaying a graphic icon on the map at the geographic location of the computing device.

8. The method of claim 1, further comprising:
   receiving input data that indicates to include non-associated experience-sharing sessions in the location-based search; and
   responsively including non-associated experience-sharing sessions when initiating the location-based search.

9. The method of claim 1, wherein causing the graphic display to display at least a portion of each associated experience-sharing session in the user-interface comprises:
   the computing device causing the graphic display to display a share preview of each associated experience-sharing session in the user-interface.

10. A system comprising:
at least one processor;
a non-transitory computer readable medium; and
program instructions stored on the non-transitory computer readable medium and executable by the at least one processor to:
   display, on a graphic display, a user-interface that provides for simultaneous previews of a plurality of experience-sharing sessions, wherein the user-interface is associated with a first user-account from a social network;
   determine a geographic location that is associated with the first user-account;
   initiate a location-based search within the social network for one or more associated experience-sharing sessions, wherein each associated experience sharing session corresponds to a second user-account from the social network that has a confirmed association with the first user-account, wherein at least one of the associated experience-sharing sessions comprises real-time point-of-view video captured by a camera on a head-mountable device (HMD) that is associated with one of the second user-accounts, and wherein the location-based search is based on the determined geographic location;
   display, in the user-interface, at least a portion of each of one or more associated experience-sharing sessions that result from the location-based search, wherein the displayed portion of each experience-sharing session comprises low-resolution real-time image feed based on real-time image data generated by one of the second computing devices, and wherein the displayed portion of each associated experience-sharing session is displayed in the user-interface at a location on a map that is associated with the corresponding second user-account; and
   in response to a data input corresponding to the displayed portion of a first of the associated experience-sharing sessions, cause the graphic display to display a first interface for the first associated experience-sharing session on the graphic display, wherein the first interface comprises a high-resolution real-time image feed based on the real-time image data generated by the associated second computing device.

11. A system comprising:
means for displaying a user-interface on a graphic display of a first computing device, wherein user-interface provides for simultaneous previews of a plurality of experience-sharing sessions, wherein the user-interface is associated with a first user-account from a social network;
means for determining a geographic location that is associated with the first user-account;
means for initiating a location-based search within the social network for one or more associated experience-sharing sessions, wherein each associated experience sharing session corresponds to a second user-account from the social network that has a confirmed association with the first user-account, wherein at least one of the associated experience-sharing sessions comprises real-time point-of-view video captured by a camera on a head-mountable device (HMD) that is associated with one of the second user-accounts from the social network, and wherein the location-based search is based on the determined geographic location;
means for displaying at least a portion of each of one or more associated experience-sharing sessions that result from the location-based search; wherein the displayed portion of each experience-sharing session comprises a lower-resolution real-time image feed based on real-time image data generated by a second computing device that is associated with the corresponding second user-account, and wherein the displayed portion of each associated experience-sharing session is displayed in the user-interface at a location on a map that is associated with the corresponding second user-account; and
means for, in response to a data input corresponding to the displayed portion of a first of the associated experience-sharing sessions, causing the graphic display to display a first interface for the first associated experience-sharing session, wherein the first interface comprises a higher-resolution real-time image feed based on the real-time image data generated by the associated second computing device.

12. A computer-implemented method comprising:
a server system receiving a request to initiate a location-based search of experience-sharing sessions, wherein the request indicates (a) a first user-account from a social network and (b) a geographic location upon which to base the location-based search, wherein the geographic location is associated with the first user-account;

the server system initiating the location-based search within the social network, wherein the location-based search comprises:

using the indicated geographic location as a basis for determining search criteria; and determining search results comprising one or more associated experience-sharing sessions that meet the search criteria, wherein each associated experience sharing session corresponds to a second user-account from the social network that has a confirmed association with the first user-account, and wherein at least one of the associated experience-sharing sessions comprises real-time point-of-view video captured by a camera on a head-mountable device (HMD) that is associated with one of the second user-accounts;

the server system sending, for each of one or more of the associated experience-sharing sessions that result from the location-based search: (a) at least a portion of the associated experience-sharing session for display on a map interface presented on a first computing device, wherein the map interface provides for simultaneous previews of a plurality of experience-sharing sessions, and (b) a location on the map that is associated with the corresponding second user-account, wherein the portion of each experience-sharing session that is sent for display comprises a low-resolution real-time image feed based on real-time image data generated by one of the second computing devices; and the server system receiving a request from the computing device to join a given one of the associated experience-sharing sessions and responsively sending a high-resolution real-time image feed based on the real-time image data generated by the associated second computing device for display at the first computing device.

13. The method of claim 12, further comprising:

generating one or more share previews, wherein each share preview is a share preview for one of the associated experience-sharing sessions;

wherein sending the search results comprises sending the one or more share previews.

14. The method of claim 12, further comprising:

in response to the request to join a given one of the associated experience-sharing sessions, sending a full version of the associated experience-sharing session to the computing device, wherein the full version comprises the high-resolution real-time image feed.

15. The method of claim 12, further comprising:

in response to the request to join a given one of the associated experience-sharing sessions:

determining whether or not the first user-account is authorized to join the given experience-sharing session; and if the first user-account is authorized to join the given experience-sharing session, then sending a full-version of the associated experience-sharing session to the computing device.

* * * * *